United States Patent
Li

(10) Patent No.: US 9,807,612 B2
(45) Date of Patent: Oct. 31, 2017

(54) SECURE DATA INTERACTION METHOD AND SYSTEM

(71) Applicant: Tendyron Corporation, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 15/306,675

(22) PCT Filed: Jan. 30, 2015

(86) PCT No.: PCT/CN2015/072057
§ 371 (c)(1),
(2) Date: Oct. 25, 2016

(87) PCT Pub. No.: WO2015/161699
PCT Pub. Date: Oct. 29, 2015

(65) Prior Publication Data
US 2017/0064554 A1    Mar. 2, 2017

(30) Foreign Application Priority Data

Apr. 25, 2014  (CN) .......................... 2014 1 0171785
Apr. 25, 2014  (CN) .......................... 2014 1 0172028

(51) Int. Cl.
*H04L 9/32*  (2006.01)
*H04W 12/06* (2009.01)
*G06Q 20/40* (2012.01)

(52) U.S. Cl.
CPC ............ *H04W 12/06* (2013.01); *G06Q 20/40* (2013.01); *H04L 9/32* (2013.01)

(58) Field of Classification Search
CPC .......... H04W 12/06; H04L 9/32; G06Q 20/40
(Continued)

(56) References Cited

U.S. PATENT DOCUMENTS 5,917,168 A * 6/1999 Nakamura ......... G06Q 20/3572
235/379
8,065,235 B2 * 11/2011 Narayanaswami .. G06Q 10/087
705/26.82
(Continued)

FOREIGN PATENT DOCUMENTS

CN    101483654 A    7/2009
CN    103516525 A    1/2014
(Continued)

OTHER PUBLICATIONS

Translation of the International Search Report and Written Opinion corresponding to International Patent Application No. PCT/CN2015/072057, dated May 6, 2015, 9 pages.

*Primary Examiner* — Samson Lemma
(74) *Attorney, Agent, or Firm* — Lathrop Gage LLP

(57) ABSTRACT

Provided are a secure data interactive method and system, the method including: scanning, by a terminal, an intelligent cipher token in a signal coverage range and obtaining identification information of the intelligent cipher token; conducting a mutual authentication between the terminal and a background system server, and/or conducting a mutual authentication between the terminal and the intelligent cipher token; obtaining, by the terminal, user information corresponding to the intelligent cipher token based on the identification information of the intelligent cipher token; and storing, by the terminal, the user information into a pre-established current user list.

16 Claims, 2 Drawing Sheets

(58) Field of Classification Search
USPC .................................................. 713/169, 173
See application file for complete search history.

(56) References Cited

U.S. PATENT DOCUMENTS

| | | | | |
|---|---|---|---|---|
| 8,433,658 B2* | 4/2013 | Bishop | ................. | G06Q 20/027 |
| | | | | 705/66 |
| 8,949,608 B2* | 2/2015 | Hoornaert | ............... | G06F 21/34 |
| | | | | 235/380 |
| 2007/0130463 A1* | 6/2007 | Law | ........................ | G06F 21/34 |
| | | | | 713/168 |
| 2009/0235339 A1* | 9/2009 | Mennes | ................. | G06F 21/33 |
| | | | | 726/5 |
| 2013/0145173 A1* | 6/2013 | Shablygin | ............... | G06F 21/34 |
| | | | | 713/185 |
| 2015/0348015 A1* | 12/2015 | Ren | .................... | G06Q 20/3226 |
| | | | | 705/41 |
| 2016/0028547 A1* | 1/2016 | Yao | ...................... | H04L 9/0825 |
| | | | | 713/176 |
| 2016/0028548 A1* | 1/2016 | Yao | ...................... | H04L 9/0825 |
| | | | | 713/176 |

FOREIGN PATENT DOCUMENTS

| | | |
|---|---|---|
| CN | 103942690 A | 7/2014 |
| CN | 103944728 A | 7/2014 |
| CN | 103944736 A | 7/2014 |

* cited by examiner

SECURE DATA INTERACTION METHOD AND SYSTEM

CROSS-REFERENCE TO RELATED APPLICATIONS

This application is a U.S. national phase application of International Application No. PCT/CN2015/072057, filed with the State Intellectual Property Office of P. R. China on Jan. 30, 2015, which is based upon and claims priority to Chinese Patent Application Serial No. 201410172028.3 and No. 201410171785.9, filed on Apr. 25, 2014, the entire contents of which are incorporated herein by reference.

FIELD

The present disclosure relates to the information security field, and more particularly, to a secure data interactive method and system.

BACKGROUND

Mobile payment is a service that allows a user to pay for consumed goods or services via a mobile terminal (such as a smart phone, a PDA, a tablet computer and a laptop). An organization or an individual may directly or indirectly send a payment instruction to a banking financial institution via the mobile terminal, the Internet or near distance sensing technology to generate monetary payment and fund flow, so as to realize the mobile payment. The mobile payment combines the mobile terminal, the Internet, the application provider and the financial institution to provide the user with financial services, like monetary payment and fee payment.

The mobile payment includes remote payment and near field payment. The remote payment refers to that the user logs in a bank website via the mobile terminal to implement payment and account operations, and is mainly applied to shopping and consumption on online e-commerce websites; the near field payment refers to that a consumer pays the merchant in real time via the mobile terminal when purchasing goods or services, and the payment is processed on the spot, which is an offline operation with no need for a mobile network but may realize local communication with either a vending machine or a POS through radio frequency (e.g. NFC), infrared ray and Bluetooth of the mobile terminal.

During the entire mobile payment, participants involved in the payment process include the consumer, the merchant, a mobile operator, a third party service provider and a bank. The consumer and the merchant are service objects of the system; the mobile operator provides network support, the bank provides banking services, and the third party service provider provides a payment platform; various parties are combined to realize the business.

Computerization and mobilization of the payment means are inevitable trends of development, but security issues concerning the mobile payment system are core issues of mobile e-commerce security. The problem to be solved is how to guarantee the security of data interaction during the mobile payment.

SUMMARY

Embodiments of the present disclosure seek to solve at least one of the problems described above.

Accordingly, a first objective of the present disclosure is to provide a secure data interactive method.

A second objective of the present disclosure is to provide a secure data interactive system.

In order to achieve the above objectives, technical solutions of the present disclosure are specifically realized in the following ways.

Embodiments of a first aspect of the present disclosure provide a secure data interactive method, including: scanning, by a terminal, an intelligent cipher token in a signal coverage range and obtaining identification information of the intelligent cipher token; conducting a mutual authentication between the terminal and a background system server, and/or conducting a mutual authentication between the terminal and the intelligent cipher token; obtaining, by the terminal, user information corresponding to the intelligent cipher token based on the identification information of the intelligent cipher token; and storing, by the terminal, the user information into a pre-established current user list.

Embodiments of a second aspect of the present disclosure provide a secure data interactive system, including: a terminal, a background system server and an intelligent cipher token. The terminal is configured to: scan the intelligent cipher token in a signal coverage range, and obtain identification information of the intelligent cipher token; conduct a mutual authentication with the background system server, and/or conduct a mutual authentication with the intelligent cipher token; obtain user information corresponding to the intelligent cipher token based on the identification information of the intelligent cipher token; store the user information into a pre-established current user list.

BRIEF DESCRIPTION OF THE DRAWINGS

The accompanying drawings used for description of embodiments will be introduced briefly in order to illustrate technical solutions of embodiments of the present disclosure more clearly. Obviously, the accompanying drawings described below are only part of embodiments of the present disclosure, and those skilled in the art may obtain other drawings based on these drawings without any creative effort.

DETAILED DESCRIPTION

Technical solutions of embodiments of the present disclosure will be described clearly and completely with reference to the drawings, and obviously, only part of embodiments are described herein. All other embodiments may be obtained by those skilled in the art based on the embodiments described, without any creative effort, and belong to the protection scope of the present disclosure.

In the present invention, it should be noted that, unless specified or limited otherwise, the terms "mounted," "connected," and "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations. In addition, terms such as "first" and "second" are used herein for purposes of description and are not intended to indicate or imply relative importance or significance.

Embodiments of the present disclosure will be further described in detail with reference to the drawings.

Figure 1:
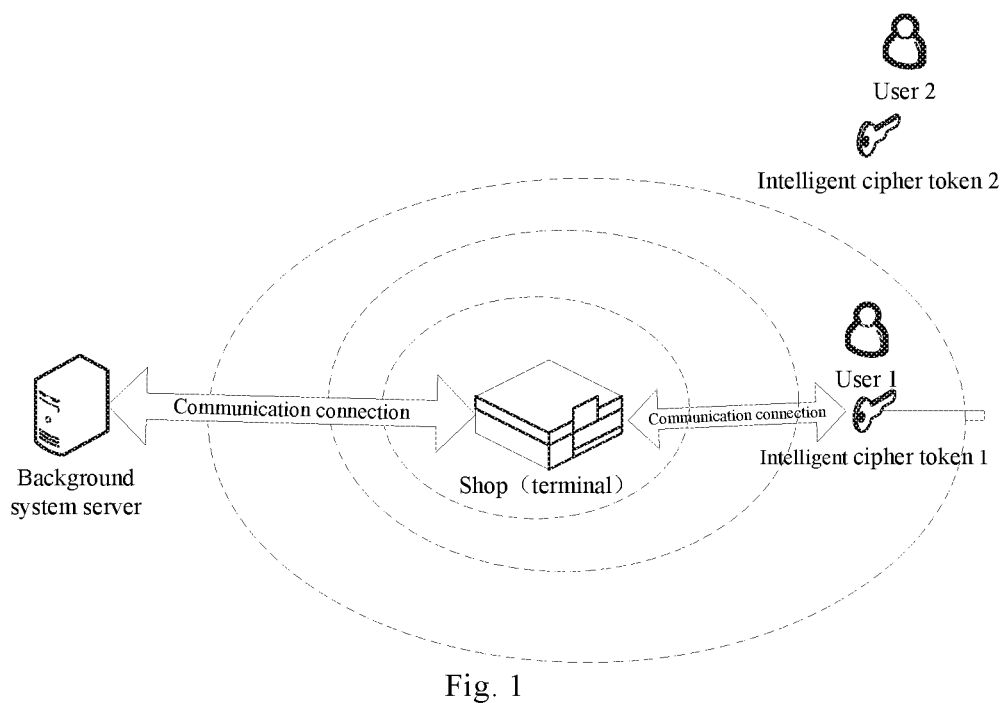
FIG. 1 is a schematic diagram of a secure data interactive system according to the present disclosure.

A secure data interactive method according to the present disclosure may be applied to a system that is constructed as shown in FIG. 1 and includes a background system server, a terminal and an intelligent cipher token.

The background system server may complete management of the terminal and the intelligent cipher token, and storage and transmission of user information, for example, management of registration, cancellation, locking and authentication of the terminal and the intelligent cipher token. The background system server may provide financial services, like banking services and payment platform services. The background system server may include one of a payment server, an authentication server and a management server, or a combination thereof.

The terminal may be a terminal at a merchant's store, configured to initiate a mobile payment, authenticate the intelligent cipher token and the background system server, and maintain the user information, etc. The terminal may automatically scan the intelligent cipher token in a signal coverage range thereof, establish communication with the intelligent cipher token, and obtain the user information corresponding to the intelligent cipher token.

The intelligent cipher token has a secure payment (e.g. an electronic signature and generation of a one-time password) function, and is able to authenticate the terminal. The intelligent cipher token has a wireless communication module (such as Bluetooth, infrared ray, RFID, NFC, light, sound wave, thermal energy, vibration, Wi-Fi, etc.) and may communicate with terminal through the wireless communication module. Moreover, the intelligent cipher token may further include a wired interface (such as an audio interface, a USB interface and a serial interface, etc.) and communicate with the terminal via the wired interface. Additionally, the intelligent cipher token may have a connection-available function, and if a user does not turn on this function, the terminal cannot obtain identification information of the intelligent cipher token and the corresponding user information. For example, the intelligent cipher token may enter a scannable state, such that the terminal is able to scan the intelligent cipher token. The connection-available function of the intelligent cipher token may be turned on by a hardware switch provided on the intelligent cipher token or by a piece of software in the intelligent cipher token.

Figure 2:
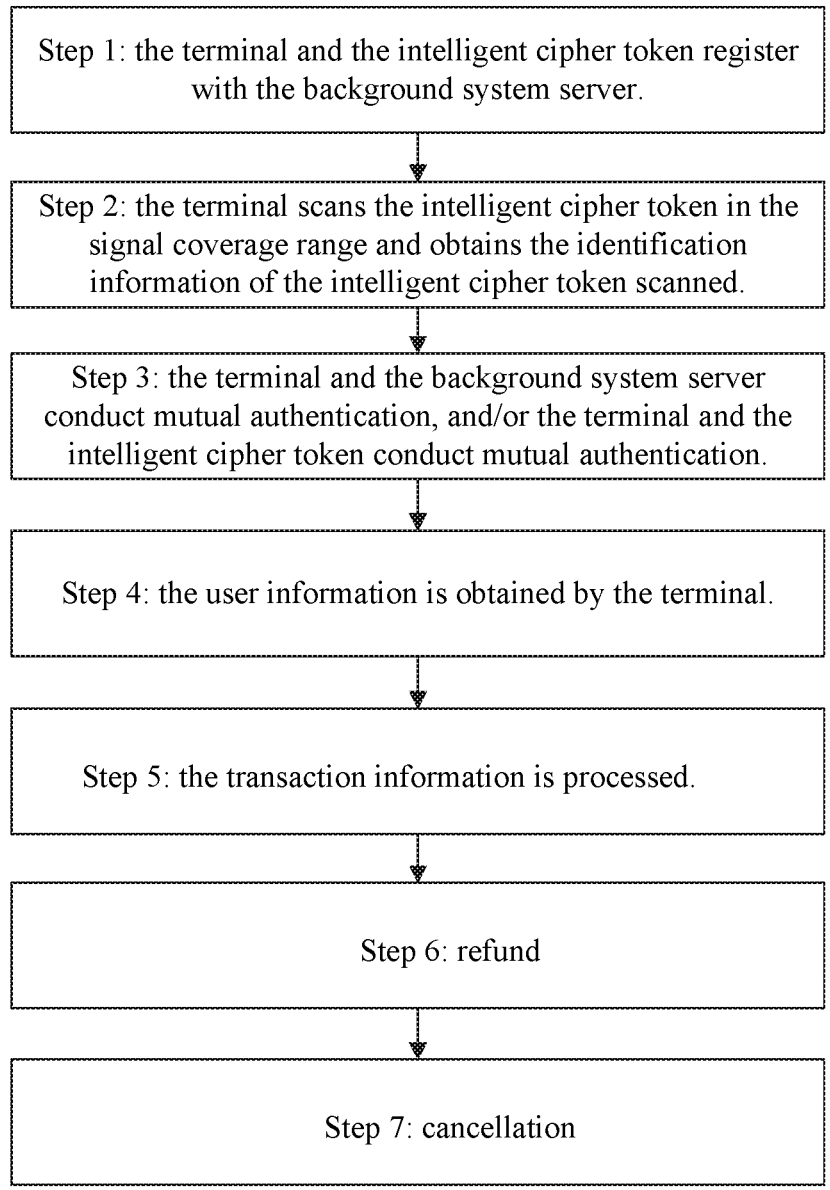
FIG. 2 is a flow chart of a secure data interactive method according to the present disclosure.

As shown in FIG. 2, the secure data interactive method includes step 1 to step 7.

Step 1: The Terminal and the Intelligent Cipher Token Register with the Background System Server.

This step includes two aspects, i.e. the terminal registers with the background system server and the intelligent cipher token registers with the background system server.

1. The Terminal Registers with the Background System Server.

The background system server receives and checks a terminal registration application. Specifically, a merchant may apply for the terminal registration at a bank counter or through the Internet, and the background system server will check the legitimacy of the merchant identity after receiving the terminal registration application.

The background system server sends a terminal key pair generating instruction to the terminal, after the terminal registration application is successfully checked (i.e., the check of the terminal registration application passes). Specifically, the background system server agrees to register the terminal of the merchant after the check of the legitimacy of the merchant identity passes, and meanwhile sends the terminal key pair generating instruction to the terminal to indicate generation of a terminal key pair which includes a pair of public and private keys.

The terminal generates the terminal key pair after receiving the terminal key pair generating instruction. Specifically, a key pair generation scheme may be preset in the terminal, and the terminal generates the terminal key pair (i.e. generating the pair of public and private keys) based on the preset key pair generation scheme after receiving the terminal key pair generating instruction.

The terminal sends a public key in the terminal key pair to the background system server. Specifically, the terminal may send the public key in the terminal key pair to the background system server through a reliable communication link, to ensure that the public key is safely sent by the terminal, or may send the public key in the terminal key pair to the background system server via the Internet, for the sake of convenience of the transmission of the public key.

The background system server generates a terminal certificate and sends the terminal certificate to the terminal, after receiving the public key in the terminal key pair. Specifically, the background system server may calculate information of the merchant and the public key of the terminal by using a private key of the background system server, so as to generate the terminal certificate. Otherwise the background system server may include a certificate authority (CA) server, and calculate the information of the merchant and the public key of the terminal by using a private key of the CA server, so as to generate the terminal certificate. Otherwise the background system server may send the information of the merchant and the public key of the terminal to the CA server, and then the CA server calculates the information of the merchant and the public key of the terminal by using the private key of the CA server to generate the terminal certificate which is sent to the terminal via the background system server.

The terminal stores the terminal certificate. Specifically, the terminal stores the terminal certificate into a storage area for performing safety functions, after receiving the terminal certificate sent by the background system server. Certainly, regarding different background system servers, the terminal may store different terminal certificates sent by different background system servers.

2. The Intelligent Cipher Token Registers with the Background System Server.

The background system server receives and checks an intelligent cipher token registration application. Specifically, a user in possession of the intelligent cipher token may apply for the intelligent cipher token registration at the bank counter or through the Internet, and the background system server will check the legitimacy of the user identity after receiving the intelligent cipher token registration application.

The background system server sends an intelligent cipher token key pair generating instruction to the intelligent cipher token, after the intelligent cipher token registration application is checked successfully (i.e., the check of the intelligent cipher token registration application passes). Specifically, the background system server agrees to register the intelligent cipher token of the user after the check of the legitimacy of the user identity passes, and meanwhile sends the intelligent cipher token key pair generating instruction to the intelligent cipher token to indicate generation of an intelligent cipher token key pair which includes a pair of public and private keys.

The intelligent cipher token generates the intelligent cipher token key pair after receiving the intelligent cipher token key pair generating instruction. Specifically, a key pair generation scheme may be preset in the intelligent cipher token, and the intelligent cipher token generates the intelligent cipher token key pair (i.e. generating the pair of public and private keys) based on the preset key pair generation scheme after receiving the intelligent cipher token key pair generating instruction.

The intelligent cipher token sends a public key in the intelligent cipher token key pair to the background system server. Specifically, the intelligent cipher token may send the public key in the intelligent cipher token key pair to the background system server through a reliable communication link, to ensure that the public key is safely sent by the intelligent cipher token, or may send the public key in the intelligent cipher token key pair to the background system server via the Internet, for the sake of convenience of the transmission of the public key of the intelligent cipher token.

The background system server generates an intelligent cipher token certificate and sends the intelligent cipher token certificate to the intelligent cipher token, after receiving the public key in the intelligent cipher token key pair. Specifically, the background system server may calculate information of the user and the public key of the intelligent cipher token by using the private key of the background system server, so as to generate the intelligent cipher token certificate. Otherwise the background system server may include the CA server, and calculate the information of the user and the public key of the intelligent cipher token by using the private key of the CA server, so as to generate the intelligent cipher token certificate. Otherwise the background system server may send the information of the user and the public key of the intelligent cipher token to the CA server, and then the CA server calculates the information of the user and the public key of the intelligent cipher token by using the private key of the CA server to generate the intelligent cipher token certificate which is sent to the intelligent cipher token by the background system server.

The intelligent cipher token stores the intelligent cipher token certificate. Specifically, the intelligent cipher token stores the intelligent cipher token certificate into a storage area for performing safety functions, after receiving the intelligent cipher token certificate sent by the background system server. Certainly, regarding different background system servers, the intelligent cipher token may store different intelligent cipher token certificates sent by different background system servers.

Step 2: The Terminal Scans the Intelligent Cipher Token in the Signal Coverage Range and Obtains the Identification Information of the Intelligent Cipher Token.

Specifically, the terminal may send an inquiry signal (e.g. a serial number of the terminal may included in it) at regular time intervals to inquire the intelligent cipher token in a certain wireless signal coverage range.

The intelligent cipher token monitors (inquiry scanning) the inquiry of the terminal, and when the intelligent cipher token enters the signal coverage range of the terminal, the identification information of the intelligent cipher token is sent to the terminal, such that the terminal scans and obtains the identification information of the intelligent cipher token.

Provided hereinafter are two methods for obtaining the identification information of the intelligent cipher token by the terminal.

(1) The Terminal May Inquire the Intelligent Cipher Token in the Certain Wireless Signal Coverage Range Via an Inquiry Access Code (IAC).

The intelligent cipher token monitors (inquiry scanning) the inquiry of the terminal, and when the intelligent cipher token enters the signal coverage range of the terminal, address and clock information of the intelligent cipher token is sent to the terminal. The intelligent cipher token monitors paging information from the terminal and conducts paging scan. The terminal pages the intelligent cipher token inquired. The intelligent cipher token sends a device access code (DAC) of the intelligent cipher token to the terminal after receiving the paging information.

(2) The Terminal Sends the Inquiry Signal to Inquire the Intelligent Cipher Token in the Certain Wireless Signal Coverage Range.

The intelligent cipher token monitors (inquiry scanning) the inquiry signal of the terminal, and when the intelligent cipher token enters the signal coverage range of the terminal, the address of the intelligent cipher token is sent to the terminal.

Certainly, the present disclosure uses the above two examples to illustrate how the terminal obtains the identification information of the intelligent cipher token, but is not limited thereby. Based on the two methods for obtaining the identification information of the intelligent cipher token, if the intelligent cipher token receives any information sent by the terminal, the intelligent cipher token may take the information as a wake-up signal, and turn a sleep state into an awakened state (i.e. a normal working mode) according to the wake-up signal. Meanwhile, the intelligent cipher token may return to the sleep state automatically after the completion of any command execution. The intelligent cipher token enters the sleep state to save energy thereof, thus lengthening service life.

Before the step of scanning the intelligent cipher token by the terminal, the intelligent cipher token needs to enter the scannable state, such that the intelligent cipher token may be scanned by the terminal, in which the implementation of entering the scannable state may be realized by the hardware switch provided on the intelligent cipher token or by a piece of software in the intelligent cipher token.

Step 3: The Terminal and the Background System Server Conduct Mutual Authentication, and/or the Terminal and the Intelligent Cipher Token Conduct Mutual Authentication.

1. The Terminal and the Background System Server Conduct Mutual Authentication.

The terminal generates first information to be signed. Specifically, the terminal may generate, by a random number generator, a random number as the first information to be signed, or may take its own serial number, a MAC address or other identification information as the first information to be signed, or may take the combination of the random number and the identification information as the first information to be signed. Any information may be taken as the first information to be signed, as long as the information is capable of being signed by the background system server, such that the background system server may be authenticated after the background system server returns signature information. The random number may be one of a figure, a letter and a special character, or a combination thereof.

The terminal sends the first information to be signed and first authentication request information to the background system server. Specifically, the terminal may send the first information to be signed and the first authentication request information to the background system server via the reliable communication link to guarantee security of information transmission, or may send the first information to be signed and the first authentication request information to the background system server via the Internet, for the sake of convenience of information transmission.

Additionally, in order to guarantee the security of data interaction and legitimacy of the terminal, the background system server may judge whether identification information of the terminal is included in a terminal abnormality list pre-stored in the background system server, after receiving the first information to be signed and the first authentication request information, in which the first authentication request information includes the identification information of the terminal. The background system server obtains a terminal locking instruction after it judges that the identification information of the terminal is included in the terminal abnormality list, signs the terminal locking instruction by using the private key of the background system server to generate fourth signature information, and sends the terminal locking instruction and the fourth signature information to the terminal. The terminal verifies the fourth signature information by using a public key in a pre-stored background system server certificate, after receiving the terminal locking instruction and the fourth signature information. The terminal executes a terminal locking operation based on the terminal locking instruction, after the fourth signature information is successfully verified (i.e., verification of the fourth signature information passes).

Specifically, the terminal abnormality list may be a list of representing terminals having illegitimate identities, such as a blacklist, a loss list and a failure list. If the identification information of the terminal is included in the terminal abnormality list, the terminal is illegitimate. In such a case, the background system server sends the terminal locking instruction to the illegitimate terminal to lock the illegitimate terminal, so as to guarantee the security. The background system server even signs the terminal locking instruction to ensure a legitimate source of the instruction, so as to avoid malicious operations of locking the terminal illegitimately.

Certainly, the present disclosure is not limited thereby; for practical applications, it is acceptable as long as the illegal terminal is locked legitimately.

Additionally, the background system server may only send the terminal locking instruction to the illegitimate terminal to lock the illegitimate terminal, without signing the terminal locking instruction.

The terminal may execute the terminal locking operation based on the terminal locking instruction in such a manner that the terminal refuses to execute any request, destroys certificates stored therein or the like.

Moreover, the background system server may refuse to execute any request from the illegitimate terminal after sends the terminal locking instruction.

Therefore, if the terminal is lost or reported as illegitimate, the identification information of the terminal will be recorded into the abnormality list such as the loss list or the blacklist of the background system server. Afterwards, if someone intends to use the terminal for illegal transactions to steal money, the background system server will compare the identification information of the terminal with the terminal abnormality list during the mutual authentication between the terminal and the background system server; if the identification information of the terminal is found in the terminal abnormality list, the background system server will lock the terminal to protect user account security.

The background system server generates second information to be signed after receiving the first information to be signed and the first authentication request information. Specifically, the background system server may generate the second information to be signed after receiving the first authentication request information, and may take a random number generated by the random number generator as the second information to be signed, or may take its own serial number, a MAC address or other identification information as the second information to be signed, or may take the combination of the random number and the identification information as the second information to be signed. Any information may be taken as the second information to be signed, as long as the information is capable of being signed by the terminal, such that the terminal may be authenticated after the terminal returns signature information. The random number may be one of a figure, a letter and a special character, or a combination thereof.

The background system server sends the second information to be signed and the background system server certificate to the terminal. Specifically, the background system server may send the second information to be signed and the background system server certificate to the terminal via the reliable communication link to guarantee the security of information transmission, or may send the second information to be signed and the background system server certificate to the terminal via the Internet to improve the convenience of information transmission.

The terminal verifies whether the background system server certificate is legitimate by using a pre-stored root certificate corresponding to the background system server certificate, after receiving the second information to be signed and the background system server certificate. Specifically, the terminal further needs to obtain the root certificate corresponding to the background system server certificate during the registration, so as to verify the legitimacy of the background system server certificate.

The terminal signs the first information to be signed and the second information to be signed by using a private key of the terminal to generate first signature information, after the background system server certificate is verified to be legitimate. Specifically, the terminal signs the first information to be signed and the second information to be signed, such that the terminal transmits the first signature information to the background system server, which guarantees the legitimate source of the data and the security of important information in the data. The first signature information in the present disclosure may be obtained by signing the information generated by connecting the first information to be signed and the second information to be signed, or may be obtained by signing the information generated by adjusting the first information to be signed and the second information to be signed according to an adjustment scheme negotiated in advance. Moreover, after the background system server certificate is verified to be legitimate, the terminal may generate a shared master key that may be specifically configured to generate a first session key, and the terminal may generate first encryption information by encrypting the shared master key with the public key in the background system server certificate, so as to transmit the shared master key safely.

The terminal sends the first signature information and the terminal certificate to the background system server. Moreover, in this step, the terminal may send the first encryption information to the background system server, besides the first signature information and the terminal certificate, if the terminal also generates the shared master key and obtains the first encryption information by encrypting the shared master key.

The background system server verifies whether the terminal certificate is legitimate by using a pre-stored root certificate corresponding to the terminal certificate. Specifically, the background system server further obtains the root certificate corresponding to the terminal certificate during the registration of the terminal, so as to verify the legitimacy of the terminal certificate.

The background system server verifies the first signature information by using a public key in the terminal certificate, after the terminal certificate is verified to be legitimate.

The background system server generates a background authentication completion message after verification of the first signature information passes, and sends the background authentication completion message to the terminal. Moreover, if the background system server also receives the first encryption information, in this step, the background system server may decrypt the first encryption information by using the private key of the background system server to obtain the shared master key.

The terminal verifies the background authentication completion message after receiving the background authentication completion message. Specifically, the terminal verifies legitimacy of the background authentication completion message.

The terminal generates a first terminal authentication completion message after verification of the background authentication completion message passes, and sends the first terminal authentication completion message to the background system server. Moreover, in this step, the terminal may calculate the first session key based on the shared master key, if the terminal generates the shared master key.

The background system server receives and verifies the first terminal authentication completion message. Specifically, the background system server verifies legitimacy of the first terminal authentication completion message.

The mutual authentication between the terminal and the background system server is completed, after verification of the first terminal authentication completion message by the background system server passes. Certainly, in this step, the background system server may calculate the first session key based on the shared master key, if the background system server also obtains the shared master key by decryption.

Based on the mutual authentication between the terminal and the background system server, the legitimacy of the both can be ensured, thereby improving security of subsequent processing.

Additionally, the background system server further opens corresponding permissions for the terminal after the verification of the first terminal authentication completion message passes. For example, the terminal may obtain the user information corresponding to the intelligent cipher token from the background system server, so as to realize management of the terminal by the background system server.

Certainly, if the first session key is generated between the terminal and the background system server, it is possible to guarantee the security and/or completeness of data transmission between the background system server and the terminal, such that the first session key is utilized to conduct encryption calculation and/or check calculation on the data to be transmitted, during subsequent data transmission carried out between the background system server and the terminal. The first session key may include an encryption key and/or a check key; the check key may be a MAC check calculation key or an HASH check calculation key; the encryption key may be a symmetric encryption calculation key; and the encryption key and/or the check key included in the first session key may be obtained by dividing the shared master key.

Certainly, the present disclosure is not limited to this generation process of the first session key initiated by the terminal. That is, the generation process of the first session key may be initiated by the background system server, in which case, the background system server may judge whether to lock the terminal, upon the identification information received from the terminal.

In the other embodiment, after the first session key is generated by one of the terminal and the background system server, the first session key may be encrypted by a public key of the other thereof and sent to the other thereof, to reduce computational complexity.

The process of generating the first session key between the terminal and the background system server may be identical to a process of generating a second session key between the terminal and the intelligent cipher token.

Provided below is a specific method for mutual authentication between the terminal and the background system server and generation of the first session key, but the present disclosure is not limited thereto.

1) The terminal at the merchant's store generates a random number R1.

2) The terminal at the merchant's store sends the random number R1 to the background system server and sends an authentication request to the background system server.

3) The background system server receives the authentication request from the terminal and generates a random number R2.

4) The background system server sends the random number R2 and the background system server certificate to the terminal.

5) The terminal verifies the background system server certificate by using the pre-stored root certificate corresponding to the background system server certificate; if the verification fails, the process is ended; if the verification passes, the terminal generates a shared master key MKey, and encrypts the MKey by using the public key in the background system server certificate, to obtain E1.

6) The terminal connects R1 and R2 to obtain R3, implements a summary calculation on R3 to obtain H1, and sign H1 by using the private key of the terminal to obtain S1.

7) The terminal sends S1, E1 and the terminal certificate to the background system server.

8) The background system server verifies the legitimacy of the terminal certificate by using the root certificate corresponding to the terminal certificate; if the verification of the terminal certificate fails, the process is ended; if the verification of the terminal certificate passes, S1 is verified by using the terminal certificate; if verification of S1 fails, the process is ended; if the verification of S1 passes, the MKey is decrypted from E1.

9) The background system server implements the summary calculation on the background system server certificate to obtain H2, implements the summary calculation on the terminal certificate to obtain H3, connects R1, R2, H2, H3, S1 and E1 to obtain T1, and obtains "a background system server authentication completion message" after the summary calculation and HMAC calculation on T1.

10) The background system server sends "the background system server authentication completion message" to the terminal.

11) The terminal verifies "the background system server authentication completion message" from the background system server; if the verification fails, the process is ended; if the verification passes, "a terminal authentication completion message" is generated (see the method for generating "the background system server authentication completion message").

12) The terminal sends "the terminal authentication completion message" to the background system server.

13) The background system server receives and verifies "the terminal authentication completion message"; if the verification fails, the process is ended; if the verification passes, it means the mutual authentication succeeds, in which case the terminal and the background system server calculate the first session key, and divide the first session key into an encryption key K1 for encryption and decryption of data transmission between the terminal and the background system server and/or a check key MACKEY for generation and check of a check value for check calculation.

In such a way, the mutual identity authentication between the terminal at the merchant's store and the background system server is implemented, the legitimacy of the both is ensured, and the public session key (including the encryption key and/or the check key) is negotiated and may be used for data encryption during the data transmission between the terminal and the background system server and/or for generation of the check value. The terminal at the merchant's store also completes "sign in" at the background system server, such that the terminal may conduct the subsequent operation requests for reading the user information and transactions.

It should be noted that the check value generated during the data transmission between the background system server and the terminal is in a form of MAC. In a specific implementation, the check value may not only be a MAC value generated by a MAC key, but also be generated by generating a summary and afterwards signing.

In this step, a secure channel is established through the mutual authentication between the terminal and the background system server; if the authentication passes, the merchant in possession of the terminal completes "sign in" at the background system server, that is, the background system server verifies the merchant in possession of the terminal to be legitimate and negotiates the first session key with the terminal, so as to realize encrypted transmission by using the first session key during transaction data interaction between the background system server and the terminal, and prepare for transmission of the user information corresponding to the intelligent cipher token and transmission of the transaction data. Afterwards, the terminal verified by the background system server may verify legitimacy of the intelligent cipher token through the background system server and obtains relevant user information of the legitimate intelligent cipher token.

2. The Terminal and the Intelligent Cipher Token Conduct Mutual Authentication.

The terminal generates third information to be signed. Specifically, the terminal may generate, by the random number generator, a random number as the third information to be signed, or may take its own serial number, the MAC address or other identification information as the third information to be signed, or may take the combination of the random number and the identification information as the third information to be signed. Any information may be taken as the third information to be signed, as long as the information is capable of being signed by the intelligent cipher token, such that the intelligent cipher token may be authenticated after the intelligent cipher token returns signature information. The random number may be one of a figure, a letter and a special character, or a combination thereof.

The terminal sends the third information to be signed and second authentication request information to the intelligent cipher token. Specifically, the terminal may send the third information to be signed and the second authentication request information to the intelligent cipher token via a wireless communication link to guarantee the convenience of information transmission, or may send the third information to be signed and the second authentication request information to the intelligent cipher token via the wired interface, for the sake of the security of information transmission.

The intelligent cipher token generates fourth information to be signed, after receiving the third information to be signed and the second authentication request information. Specifically, the intelligent cipher token may generate the fourth information to be signed, after receiving the second authentication request information, and may take a random number generated by the random number generator as the fourth information to be signed, or take its own serial number, the MAC address or other identification information (e.g. DAC) as the fourth information to be signed, or take the combination of the random number and the identification information as the fourth information to be signed. Any information may be taken as the fourth information to be signed, as long as the information is capable of being signed by the terminal, such that the terminal may be authenticated after the terminal returns signature information. The random number may be one of a figure, a letter and a special character, or a combination thereof.

Additionally, in the step of generating the fourth information to be signed after the intelligent cipher token receives the third information to be signed and the second authentication request information, the intelligent cipher token may also turn the sleep state into the awakened state after receiving the second authentication request information. The intelligent cipher token generates the fourth information to be signed in the awakened state. The intelligent cipher token turns the sleep state into the awakened state to complete the normal work, and switches back to the sleep state after the work is finished to reduce the energy consumption and prolong the service life.

The intelligent cipher token signs the third information to be signed by using a private key of the intelligent cipher token to obtain second signature information, and sends the fourth information to be signed, the second signature information and the intelligent cipher token certificate to the terminal.

The terminal verifies whether the intelligent cipher token certificate is legitimate by using a pre-stored root certificate corresponding to the intelligent cipher token certificate, after receiving the fourth information to be signed, the second signature information and the intelligent cipher token certificate. Specifically, the terminal also needs to obtain the root certificate corresponding to the intelligent cipher token certificate, so as to verify legitimacy of the intelligent cipher token certificate.

The terminal verifies the second signature information by using a public key in the intelligent cipher token certificate, after the intelligent cipher token certificate is verified to be legitimate.

The terminal signs the third information to be signed and the fourth information to be signed by using the private key of the terminal to generate third signature information, after verification of the second signature information passes. Specifically, the terminal signs the third information to be signed and the fourth information to be signed, after the verification of the second signature information passes, to guarantee security and non-repudiation of transmitting the third information to be signed and the fourth information to be signed and to guarantee a legitimate source of the transmitted information. Moreover, the terminal may generate a first session key generation factor, and encrypts the first session key generation factor by using the public key in the intelligent cipher token certificate to obtain second encryption information. Specifically, after verification of the intelligent cipher token certificate and verification of a signature of the intelligent cipher token pass, the terminal generates a generation factor (i.e. the first session key generation factor, which is configured to generate the second session key for data interaction between the terminal and the intelligent cipher token) of the second session key for data interaction between the terminal and the intelligent cipher token, and meanwhile encrypts the first session key generation factor by using the public key in the intelligent cipher token certificate to guarantee security of transmission of the first session key generation factor.

The terminal sends the third signature information and the terminal certificate to the intelligent cipher token. Certainly, if the terminal generates the first session key generation factor and obtains the second encryption information by encrypting the first session key generation factor with the public key in the intelligent cipher token certificate, in this step, the terminal also sends the second encryption information, besides the third signature information and the terminal certificate, to the intelligent cipher token.

The intelligent cipher token verifies whether the terminal certificate is legitimate by using the pre-stored root certificate corresponding to the terminal certificate, after receiving the third signature information and the terminal certificate. Specifically, the intelligent cipher token further obtains the root certificate corresponding to the terminal certificate, so as to verify the legitimacy of the terminal certificate. Certainly, if the terminal sends the second encryption information to the intelligent cipher token, in this step, the intelligent cipher token also receives the second encryption information sent by the terminal.

The intelligent cipher token verifies the third signature information by using the public key in the terminal certificate, after the terminal certificate is verified to be legitimate.

The intelligent cipher token generates an intelligent cipher token authentication completion message after verification of the third signature information passes. Specifically, after verification of the terminal certificate and verification of the third signature information of the terminal pass, the intelligent cipher token generates the intelligent cipher token authentication completion message to notify that the intelligent cipher token has been authenticated. Certainly, if the intelligent cipher token also receives the second encryption information, in this step, the intelligent cipher token further generates a second session key generation factor, and encrypts the second session key generation factor by using the public key in the terminal certificate to obtain third encryption information. Specifically, after verification of the terminal certificate and verification of the signature information of the terminal pass, the intelligent cipher token generates a generation factor (i.e. the second session key generation factor, which is configured to generate the second session key for the data interaction between the terminal and the intelligent cipher token) of the second session key for the data interaction between the terminal and the intelligent cipher token, and meanwhile encrypts the second session key generation factor by using the public key in the terminal certificate to guarantee security of transmission of the second session key generation factor.

The intelligent cipher token sends the intelligent cipher token authentication completion message to the terminal. Certainly, if the intelligent cipher token also generates the second session key generation factor, and obtains the third encryption information by encrypting the second session key generation factor, in this step, the intelligent cipher token further sends the third encryption information to the terminal, besides the intelligent cipher token authentication completion message.

The terminal verifies the intelligent cipher token authentication completion message, after receiving the intelligent cipher token authentication completion message. Specifically, the terminal further verifies the intelligent cipher token authentication completion message to ensure a legitimate source of the intelligent cipher token authentication completion message. Certainly, if the intelligent cipher token also sends the third encryption information to the terminal, in this step, the terminal further receives the third encryption information.

The terminal generates a second terminal authentication completion message after verification of the intelligent cipher token authentication completion message passes, and sends the second terminal authentication completion message to the intelligent cipher token. Specifically, the terminal generates the second terminal authentication completion message after verification of the intelligent cipher token authentication completion message passes, to notify that the verification of the intelligent cipher token is completed. Certainly, if the terminal also receives the third encryption information, in this step, the terminal further generates the second session key according to the first session key generation factor and the second session key generation factor obtained by decryption of the third encryption information, so as to interact data with the intelligent cipher token via the second session key.

The intelligent cipher token verifies the second terminal authentication completion message, after receiving the second terminal authentication completion message. Specifically, the intelligent cipher token further verifies the second terminal authentication completion message to ensure a legitimate source of the second terminal authentication completion message.

The mutual authentication between the terminal and the intelligent cipher token is completed, after verification of the second terminal authentication completion message passes. Certainly, if the intelligent cipher token further generates the second session key generation factor and receives the second encryption information, in this step, the intelligent cipher token further generates the second session key according to the second session key generation factor and the first session key generation factor obtained by decryption of the second encryption information, so as to interact data with the terminal via the second session key.

Based on the mutual authentication between the terminal and the intelligent cipher token, the legitimacy of the both can be ensured, thereby improving security of subsequent processing.

Certainly, the present disclosure is not limited to this generation process of the second session key initiated by the terminal. That is, the generation process of the second session key may be initiated by the intelligent cipher token.

In other embodiments, after the second session key is generated by one of the terminal and the intelligent cipher token, the second session key may be encrypted by a public key of the other thereof and sent to the other thereof, to reduce computational complexity.

Certainly, the process of generating the second session key between the terminal and the intelligent cipher token may be identical to the above process of generating the first session key between the terminal and the background system server. That is, the second session key may be obtained by dividing the shared master key.

Provided below is a specific method for mutual authentication between the terminal and the intelligent cipher token and generation of the second session key, but the present disclosure is not limited thereto.

1) The terminal sends an authentication request to the intelligent cipher token, and sends a random number R01.

2) The intelligent cipher token in the sleep state is awakened after receiving the authentication request from the terminal.

3) The intelligent cipher token generates a random number R02, conducts a summary calculation on R01, and encrypts a summary by using its private key to generate a signature S01; the intelligent cipher token sends the random number R02, the signature S01 and the intelligent cipher token certificate to the terminal.

4) The terminal verifies the legitimacy of the intelligent cipher token certificate by using the pre-stored root certificate corresponding to the intelligent cipher token certificate; if the intelligent cipher token certificate is verified to be illegitimate, connection is ended; if the intelligent cipher token certificate is verified to be legitimate, step 5) is executed.

5) The terminal verifies whether the signature S01 is right; if the signature S01 is wrong, connection is ended; if the signature S01 is right, step 6) is executed.

6) The terminal connects R01 and R02 to form R01|R02, generates a summary regarding R01|R02 and signs the summary to obtain a signature S02, generates a random number R03, encrypts R03 by using the public key of the intelligent cipher token to generate a cryptograph E01, and sends E01, the terminal certificate and S02 to the intelligent cipher token.

7) The intelligent cipher token verifies the legitimacy of the terminal certificate by using the pre-stored root certificate corresponding to the terminal certificate; if the terminal certificate is verified to be illegitimate, connection is ended; if the terminal certificate is verified to be legitimate, step 8) is executed.

8) The intelligent cipher token verifies whether the signature S02 is right; if the signature S02 is wrong, connection is ended; if the signature S02 is right, step 9) is executed.

9) The intelligent cipher token generates a random number R04, encrypts R04 by using the public key of the terminal to generate a cryptograph E02, and sends the cryptograph E02 to the terminal.

10) The terminal generates an authentication completion message, conducts the summary calculation on the terminal certificate to obtain H01, conducts the summary calculation on the intelligent cipher token certificate to obtain H02, connects R01, R02, E01, E02, H01, H02, S01 and S02 to obtain T01, conducts the summary calculation on T01 and sign the summary, obtains "terminal authentication completion message" F01, and sends F01 to the intelligent cipher token.

11) The intelligent cipher token receives and verifies F01; if verification of F01 fails, an error message is returned and the connection is ended; if the verification of F01 passes, step 12) is executed.

12) The intelligent cipher token generates an authentication completion message F02 in the same way, and sends the authentication completion message F02 to the terminal.

13) The terminal verifies F02; if verification of F02 fails, an error message is returned and the connection is ended; if the verification of F02 passes, step 14) is executed.

14) The intelligent cipher token and the terminal connect R03 and R04 respectively to obtain R03|R04, and a second session key K2 (may simply be an encryption key) is generated by using R03|R04 and configured for later secure data transmission between the intelligent cipher token and the terminal.

Therefore, the difference between the mutual authentication (a second process) between the terminal and the intelligent cipher token and the mutual authentication (a first process) between the background system server and the terminal lies in that the first process generates the encryption key and the check key (e.g. MACKEY), while the second process only generates the encryption key without the check key (certainly, it may also generate the check key).

The check key serves to generate the check value that is used to check whether the data is tampered with during transmission. A data sender generates the check value from the transmitted data with the check key by using a particular algorithm, and a data receiver checks whether the received data is tampered with by using the check value and the check key. Regarding the subsequent processing between the terminal and the intelligent cipher token, when the transaction data is transmitted between the terminal and the intelligent cipher token, the user may personally judge whether the data is right based on information displayed on the intelligent cipher token, without further introduction of the check value; the terminal may judge whether the information is tampered with by checking the signature sent from the intelligent cipher token, without further introduction of the check value. In such a way, the check key is no longer needed during the generation of the second session key, which simplifies the processing flow and improves the communication efficiency. Moreover, the check key may be generated to further improve the security.

Nevertheless, for the processing between the background system server and the terminal, since the background system server does not know transaction details, the check value is introduced to judge whether the data is tampered with, so as to guarantee the security.

Therefore, in the first process, the shared master key is generated by one of the background system server and the terminal, processed with a particular algorithm and thereby divided into the encryption key and the check key; in the second process, the terminal and the intelligent cipher token each generates one generation factor of the encryption key, and the two generation factors are combined as the encryption key. Moreover, the generation modes of the session key in the first process and that in the second process may be applied to the generation of the first session key between the terminal and the background system server, or to the generation of the second session key between the terminal and the intelligent cipher token.

Thus, the mutual authentication between the terminal and the intelligent cipher token may prevent phishing risks, tampering with transmitted information, remote hijacking and man-in-the-middle attacks, so as to effectively guarantee account fund security of the terminal and the intelligent cipher token.

In this step, it is possible to only construct a system of methods for the mutual authentication between the terminal and the background system server and establish a secure channel there between; it is also possible to only construct a system of methods for the mutual authentication between the terminal and the intelligent cipher token and establish a secure channel there between; it is also possible to construct a system of methods for mutual authentication among the background system server, the terminal and the intelligent cipher token, and establish secure channels among the three. Every one of the systems of methods for mutual authentication may prevent phishing risks, tampering with transaction information, remote hijacking and man-in-the-middle attacks, so as to effectively guarantee account fund security of the user in possession of the intelligent cipher token and the merchant in possession of the terminal.

Furthermore, the present disclosure is not limited to that step 3 follows step 2, that is, step 3 may be completed before step 2 or completed simultaneously with step 2, as long as the authentication is completed before step 4.

Moreover, the first session key in the present disclosure may be pre-stored in the background system server and the terminal, or generated through negotiation between the background system server and the terminal; the first session key may be generated through negotiation during the mutual authentication between the terminal and the background system server (see the processing flow of the mutual authentication between the terminal and the background system server).

Certainly, all the information transmitted between the background system server and the terminal may be transmitted after the encryption calculation and/or check calculation via the first session key.

The second key in the present disclosure may be pre-stored in the terminal and the intelligent cipher token, or generated through negotiation between the terminal and the intelligent cipher token; the second session key may be generated through negotiation during the mutual authentication between the terminal and the intelligent cipher token (see the processing flow of the mutual authentication between the terminal and the intelligent cipher token).

Certainly, all the information transmitted between the terminal and the intelligent cipher token may be transmitted after the encryption calculation and/or check calculation via the second session key.

Step 4: The User Information is Obtained by the Terminal.

Specifically, in this step, the terminal obtains the user information (for example, a photo, name or an account of the user) corresponding to the intelligent cipher token based on the identification information of the intelligent cipher token; the user information corresponding to the intelligent cipher token may be obtained specifically in but not limited to the following first way and second way.

First way: the terminal obtains the user information corresponding to the intelligent cipher token from the background system server.

The terminal sends the identification information of the intelligent cipher token and a user information reading request to the background system server. Specifically, the terminal may directly send the identification information of the intelligent cipher token and the user information reading request to the background system server; or may first subject the identification information of the intelligent cipher token and/or the user information reading request to encryption calculation and/or check calculation via the first session key and then send them, so as to guarantee security and completeness of information transmission.

The background system server obtains the user information corresponding to the intelligent cipher token based on the identification information of the intelligent cipher token, after receiving the identification information of the intelligent cipher token and the user information reading request. Specifically, the background system server pre-stores the user information corresponding to each registered intelligent cipher token, so as to obtain the user information corresponding to the intelligent cipher token based on the received identification information of the intelligent cipher token. Certainly, if the terminal sends the information undergoes the encryption calculation and/or the check calculation to the background system server, in this step, the background system server further needs to subject the received information to decryption calculation and/or check verification calculation by using the first session key, and obtains the complete identification information of the intelligent cipher token and/or the user information reading request after the information is determined to be right.

Additionally, in order to guarantee the security of data interaction and the legitimacy of the intelligent cipher token, the background system server further judges whether the identification information of the intelligent cipher token is included in an intelligent cipher token abnormality list pre-stored in the background system server, after receiving the identification information of the intelligent cipher token and the user information reading request. After the background system server judges that the identification information of the intelligent cipher token is included in the intelligent cipher token abnormality list, the background system server obtains an intelligent cipher token locking instruction, signs the intelligent cipher token locking instruction by using the private key of the background system server to generate fifth signature information, and sends the intelligent cipher token locking instruction and the fifth signature information to the intelligent cipher token via the terminal. The intelligent cipher token verifies the fifth signature information by using the public key in the pre-stored background system server certificate, after receiving the intelligent cipher token locking instruction and the fifth signature information. The intelligent cipher token executes an intelligent cipher token locking operation based on the intelligent cipher token locking instruction, after verification of the fifth signature information passes.

Specifically, the intelligent cipher token abnormality list may be a list representing intelligent cipher token having illegitimate identities, such as a blacklist, a loss list and a failure list. If the identification information of the intelligent cipher token is included in the intelligent cipher token abnormality list, the intelligent cipher token is illegitimate. In such a case, the background system server sends the intelligent cipher token locking instruction to the illegitimate intelligent cipher token via the terminal to lock the illegitimate intelligent cipher token, so as to guarantee the security, and the background system server also signs the intelligent cipher token locking instruction to ensure a legitimate source of the instruction, so as to avoid malicious operations of locking the intelligent cipher token illegitimately.

Certainly, the present disclosure is not limited thereby; for practical applications, it is acceptable as long as the illegitimate intelligent cipher token is locked legitimately.

Additionally, the background system server may only send the intelligent cipher token locking instruction to the illegitimate intelligent cipher token to lock the illegitimate intelligent cipher token, without signing the intelligent cipher token locking instruction.

The intelligent cipher token may execute the intelligent cipher token locking operation based on the intelligent cipher token locking instruction in such a manner that the intelligent cipher token refuses to execute any request, destroys certificates stored therein or the like.

Certainly, the background system server may refuse to execute any request from the illegitimate intelligent cipher token after sends the intelligent cipher token locking instruction.

Therefore, with the method according to embodiments of the present disclosure, if the user losses the intelligent cipher token, the user may report the loss to the background system server, and then the background system server records a device identification code of the intelligent cipher token into the loss list; or if any account abnormality occurs and is reported, the background system server will record the intelligent cipher token into the blacklist. The devices in the above lists are recorded as abnormal devices in the abnormality list. Before every transaction, the background system server verifies the intelligent cipher token—comparing the device identification with the abnormality list, and locks the intelligent cipher token if the device identification is recorded in the abnormality list. With this method, if someone else embezzles the intelligent cipher token and intends for transfer account to steal money illegally, since the background system server verifies the intelligent cipher token before each transaction occurs, the background system server may lock the intelligent cipher token remotely, such that the user account may be protected from loss even if the intelligent cipher token is embezzled by someone else.

Additionally, in the present disclosure, when sending the intelligent cipher token locking instruction and the fifth signature information to the intelligent cipher token via the terminal, the background system server may subject the intelligent cipher token locking instruction and the fifth signature information to encryption calculation and/or check calculation via the first session key, so as to guarantee security and/or completeness of the transmission of the intelligent cipher token locking instruction and the fifth signature information. The terminal obtains the intelligent cipher token locking instruction and the fifth signature information through decryption calculation and/or check verification calculation by using the first session key, after receiving the information that undergoes the encryption calculation and/or the check calculation. Certainly, after the terminal obtains the intelligent cipher token locking instruction and the fifth signature information, the terminal may also subject the intelligent cipher token locking instruction and the fifth signature information to the encryption calculation and/or the check calculation via the second session key, and then sends the information that undergoes the encryption calculation and/or the check calculation to the intelligent cipher token, to guarantee the security and/or completeness of information transmission. The intelligent cipher token conducts decryption calculation and/or check verification calculation after receiving the information sent by the terminal, to obtain the intelligent cipher token locking instruction and the fifth signature information.

Moreover, in order to guarantee the security of the user information, the background system server further needs to be authorized by the user in possession of the intelligent cipher token before sending the user information corresponding to the intelligent cipher token to the terminal. The background system server may send user authorization request information (e.g. a random number) to the intelligent cipher token via the terminal. The intelligent cipher token generates authorization information (e.g. information obtained by signing the random number) after receiving the user authorization request information, and sends the authorization information to the background system server via the terminal. The background system server executes a step of sending response information of the user information reading request to the terminal, after receiving the authorization information. Certainly, the background system server may sign the user authorization request information by using the private key of the background system server, and then send it to the intelligent cipher token via the terminal; the intelligent cipher token verifies the signature after receiving the signature information; after the verification passes, the user authorization request information is considered to come from a legitimate background system server, and the request is confirmed to authorize the background system server. The intelligent cipher token may sign the authorization information by using the private key of the intelligent cipher token and then send it to the background system server via the terminal; the background system server verifies the signature after receiving the signature information; after the verification passes, the authorization information is considered to come from a right intelligent cipher token, and subsequent operations are implemented based on the authorization information. Furthermore, the background system server may subject the user authorization request information to encryption calculation and/or check calculation via the first session key, and then sends it to the terminal; the terminal conducts decryption calculation and/or check verification calculation on the received information via the first session key. The terminal may conduct the encryption calculation and/or check calculation on the user authorization request information via the second session key and then sends it to the intelligent cipher token; the intelligent cipher token conducts decryption calculation and/or check verification calculation on the received information via the second session key. The background system server may further conduct the encryption calculation and/or check calculation on the user authorization request information via the first session key after signing it by using the private key of the background system server; the terminal conducts decryption calculation and/or check verification calculation on the received information via the first session key. The terminal conducts the encryption calculation and/or check calculation, via the second session key, on the information signed by the background system server, and then sends the information to the intelligent cipher token; the intelligent cipher token conducts the decryption calculation and/or check verification calculation on the received information via the second session key, and verifies the signature. The present disclosure is not limited to the above ways of requesting the intelligent cipher token for authorization of the background system server, and all kinds of combinations of the above ways fall into the protection scope of the present disclosure.

Moreover, the intelligent cipher token may turn from the sleep state into the awakened state after receiving the user authorization request information, and generate the authorization information in the awakened state, so as to save energy and prolong service life of the intelligent cipher token.

The background system server obtains the response information of the user information reading request based on the user information, and sends the response information of the user information reading request to the terminal. Certainly, the user information may undergo the encryption calculation and/or check calculation through the first session key, to guarantee the security and/or completeness of transmitting the user information.

The terminal obtains the user information based on the response information of the user information reading request, after receiving the response information of the user information reading request. Certainly, if what the terminal receives is the information obtained by encryption calculating and/or check calculating on the user information, in this step, the terminal further conducts the decryption calculation and/or check verification calculation on the response information of the user information reading request via the first session key, so as to obtain the user information.

Second way: the terminal obtains the user information corresponding to the intelligent cipher token from the intelligent cipher token.

The terminal sends the user information reading request to the intelligent cipher token based on the identification information of the intelligent cipher token. Specifically, the terminal may directly send the user information reading request to the intelligent cipher token, or may conduct the encryption calculation and/or check calculation on the user information reading request via the second session key and then send it, so as to guarantee security and completeness of information transmission.

The intelligent cipher token obtains the pre-stored user information, obtains the response information of the user information reading request based on the pre-stored user information, and sends the response information of the user information reading request to the terminal. Specifically, the intelligent cipher token may directly send the user information to the terminal, or may obtain the response information of the user information reading request after the encryption calculation and/or check calculation on the user information via the second session key, and then send the response information to the terminal.

The terminal obtains the user information based on the response information of the user information reading request, after receiving the response information of the user information reading request. Certainly, if what the terminal receives is the information obtained by encryption calculating and/or check calculating on the user information, in this step, the terminal further conducts the decryption calculation and/or check verification calculation on the response information of the user information reading request via the second session key, so as to obtain the user information.

Additionally, if the user in possession of the intelligent cipher token refuses to send the user information, a reject message may be sent to the terminal through a button provided on the intelligent cipher token or through a piece of software, to guarantee the security of the user information. Certainly, the reject message may be sent after the encryption calculation and/or check calculation via the second session key.

The terminal stores the user information into a pre-established current user list. Specifically, the intelligent cipher tokens scanned varies constantly due to the staff turnover and the customer flow rate change in the shop where the terminal is. In such a case, the pre-established current user list may be updated in but not limited to the following two modes.

First Update Mode:

The terminal generates a real-time identification list, after obtaining identification information of all the intelligent cipher tokens in the signal coverage range of the terminal.

The terminal compares each piece of identification information in the real-time identification list with all the identification information in the pre-established current user list, at a predetermined time interval.

The step of obtaining user information corresponding to an scanned intelligent cipher token by the terminal respectively based on the identification information included in the pre-established current user list but not included in the real-time identification list is executed, the user information corresponding to each intelligent cipher token whose identification information is included in the pre-established current user list but not included in the real-time identification list is deleted from the pre-established current user list.

If the pre-established current user list is updated in this mode, it is possible to ensure that the user information corresponding to the intelligent cipher token(s) in the signal coverage range of the terminal is updated to the pre-established current user list, and the user information corresponding to the intelligent cipher token(s) leaving the signal coverage range is deleted from the pre-established current user list, thereby guaranteeing security.

Second Update Mode:

The terminal generates a real-time identification list, after obtaining identification information of all the intelligent cipher tokens in the signal coverage range of the terminal.

The terminal compares each piece of identification information in the real-time identification list with all the identification information in the pre-established current user list, at a predetermined time interval.

The step of obtaining user information corresponding to an intelligent cipher token by the terminal respectively based on the identification information included in the real-time identification list but not included in the pre-established current user list is executed, and the obtained user information is stored into the real-time identification list; the user information corresponding to each intelligent cipher token with the identification information included in the real-time identification list and included in the pre-established current user list is copied from the pre-established current user list to the real-time identification list.

The real-time identification list is taken as an updated current user list.

If the pre-established current user list is updated in this mode, it is possible to only update the user information corresponding to the intelligent cipher token(s) in the signal coverage range of the terminal timely, so as to improve update efficiency. In this mode, when obtaining the user information, the terminal may copy the user information corresponding to the original intelligent cipher token(s) in the shop from the pre-established current user list into the real-time identification list, and obtain the user information corresponding to new customers going into the shop by making the user information reading request to the background system server or the intelligent cipher token.

Therefore, when the customer flow rate in the shop where the terminal is located changes, the pre-established current user list may be updated automatically with no need for operations by the merchant, so it is convenient for store clerks to manage and maintain the customer information.

Additionally, the terminal may display the user information corresponding to the intelligent cipher token stored in the current user list, such that the user in possession of the intelligent cipher token may check the user information to guarantee the validity of the transaction.

In the prior art, the transaction process needs a device with an account storage function, for example, a SIM card and a smart card, and the user needs to swipe card or tap the mobile phone, such that the merchant may obtain account information of the user.

Compared with the prior art, in the present disclosure, the terminal of the merchant may first read the identification information of the intelligent cipher token and then obtain the user information corresponding to the intelligent cipher token based on the identification information of the intelligent cipher token. Thus, the customer can pay for goods without need for the purse, the credit card and the mobile phone, thereby simplifying interactive operations between the customer and the merchant and improving the user experience.

Step 5: The Transaction Information is Processed.

The terminal generates the transaction information based on the user information corresponding to the intelligent cipher token involved in the transaction, and obtains transaction request information based on the transaction information. Specifically, the transaction information may contain transaction amount, account information of payer and payee, identification information of the payer and payee; the transaction information may further include an electronic statement of account, based on which the user may check transaction details, such as specific transaction time, transaction number, transaction amount and goods purchased. Moreover, the terminal may conduct the encryption calculation and/or the check calculation on the transaction information via the second session key to guarantee the security and/or the completeness of the transaction information transmission.

The terminal sends the transaction request information to the intelligent cipher token. Specifically, the terminal may send the transaction request information in but not limited to the following ways. The terminal sends the transaction request information via an acoustic signal after encoding it; or the terminal graphically encodes the transaction request information and displays it for image collection by the intelligent cipher token; or the terminal sends the transaction request information via a communication interface of the terminal matching the intelligent cipher token.

The intelligent cipher token obtains the transaction information based on the transaction request information after receiving the transaction request information. Certainly, if what the terminal receives is the transaction request information obtained by encryption calculating and/or the check calculating on the transaction information by the terminal via the second session key, in this step, the intelligent cipher token will conduct the decryption calculation and/or the check verification calculation on the transaction request information via the second session key to obtain the transaction information, thereby guaranteeing the security and/or completeness of the transaction information transmission.

In order to save energy of the intelligent cipher token and prolong the service life thereof, the intelligent cipher token may further turn the sleep state into the awakened state after receiving the transaction request information. The intelligent cipher token obtains the transaction information in the awakened state based on the transaction request information. Certainly, the intelligent cipher token may conduct the decryption calculation and/or the check verification calculation on the transaction request information via the second session key in the awakened state to obtain the transaction information.

The intelligent cipher token prompts the transaction information. Specifically, the intelligent cipher token may display the transaction information on a display screen, or broadcast it in the form of speech via a loudspeaker. Certainly, the intelligent cipher token may prompt the user in other manners to obtain authentic transaction information so as to guarantee the security of the transaction. Additionally, the intelligent cipher token may extract key information from the transaction information after obtaining the transaction information, and only prompt the key information, in which the specific prompting manner may refer to the prompting manner of the transaction information.

The intelligent cipher token receives a confirmation instruction and generates transaction confirmation information. Specifically, the intelligent cipher token may receive the confirmation instruction by detecting information which is sent when a confirmation key provided on the intelligent cipher token is pressed down; or may receive the confirmation instruction by detecting information which is sent when a virtual confirmation key on a touch screen is clicked; or take biological features (like voice, fingerprint and iris) as the confirmation instruction. Further, the intelligent cipher token may generate the transaction confirmation information in but not limited to the following ways. The intelligent cipher token signs the transaction information by using the private key of the intelligent cipher token, generates transaction signature information as the transaction confirmation information; or intelligent cipher token generates a one-time password as the transaction confirmation information. Certainly, the transaction confirmation information may be the information through the encryption calculation and/or the check calculation via the second session key.

Certainly, in order to prevent repeated transactions and guarantee the user account security, every time the intelligent cipher token generates the transaction confirmation information, it also generates single transaction identification and signs the transaction information and the single transaction identification by using the private key of the intelligent cipher token, to obtain the transaction signature information as the transaction confirmation information, or it generates the single transaction identification, signs the single transaction identification by using the private key of the intelligent cipher token to obtain signature information of the single transaction identification, generates the one-time password, and takes the signature information of the single transaction identification and the one-time password as the transaction confirmation information, so as to ensure that a transaction will be successfully executed only once, in which the single transaction identification may be a random number. Certainly, the transaction confirmation information may also be the information through the encryption calculation and/or the check calculation via the second session key.

Because the wireless network transmission line is unstable, it is possible that the intelligent cipher token does not receive any receipt. If the single transaction identification is not provided, the user in possession of the intelligent cipher token may need to implement confirmation signing operations repeatedly when the terminal does not receive the signature information of the intelligent cipher token. That is, the intelligent cipher token sends the signature information to the terminal repeatedly, so it is possible that the terminal generates several transaction data packets from several signature values and sends the packets to the background system server, which causes repeated deductions on an account corresponding to the intelligent cipher token. However, if the single transaction identification is provided, when the wireless network transmission line is unstable, the intelligent cipher token will sign the transaction information and the same single transaction identification and then send them to the terminal, until the intelligent cipher token receives a receipt. The terminal generates the transaction data packet by using the signature value sent from the intelligent cipher token; the background system server makes judgment on whether the single transaction identification contained in the transaction data packet; if the single transaction identification has been stored in a transaction log, that is, the transaction has been performed, the transaction data packet will not be processed, so as to avoid several or repeated deductions and thus protect the account fund security of the user in possession of the intelligent cipher token.

The terminal receives the transaction confirmation information. Specifically, the terminal may receive the transaction confirmation information in but not limited to the following ways. The terminal receives the acoustic signal sent by the intelligent cipher token and decodes the acoustic signal to obtain the transaction confirmation information (e.g. the acoustic signal may be identified by an acoustic identification device and decoded by an acoustic decoder, so as to obtain the transaction confirmation information); or the terminal collects image information (e.g. a 2-dimensional code, a barcode, etc.) displayed by the intelligent cipher token and decodes the image information to obtain the transaction confirmation information (e.g. the image information is collected by an image collection device and decoded by a decoder to obtain the transaction confirmation information); or the terminal receives the transaction confirmation information via the communication interface of the terminal matching the intelligent cipher token; or the terminal obtains the transaction confirmation information from the information inputted at the terminal. If the transaction confirmation information is obtained through the encryption calculation and/or the check calculation via the second session key, in this step, the calculated information also undergoes the decryption calculation and/or the check verification calculation via the second session key.

The terminal obtains the transaction data packet based on the transaction confirmation information, and sends the transaction data packet to the background system server. Specifically, the transaction data packet may include other information besides the transaction information. The transaction information may contain the transaction amount, the account information of payer and payee, the identification information of the payer and payee; the transaction information may further include the electronic statement of account, based on which the user may check transaction details, such as specific transaction time, transaction number, transaction amount and goods purchased. Certainly, the terminal may conduct, via the first session key, the encryption calculation and/or the check calculation on the transaction confirmation information or on information obtained after decrypting the transaction confirmation information, so as to guarantee the security and/or the completeness of the information transmission.

The background system server obtains the transaction confirmation information based on the transaction data packet after receiving the transaction data packet. Certainly, the background system server may conduct the decryption calculation and/or the check verification calculation on the transaction data packet via the first session key to obtain the transaction confirmation information.

The background system server verifies the transaction confirmation information and executes the transaction after the verification passes. Specifically, it proves that the transaction is confirmed by the legitimate intelligent cipher token, only after the verification of the transaction confirmation information by the background system server passes, and then the transaction is executed based on the confirmed result. Certainly, in order to ensure that the owner of the intelligent cipher token is informed of the completion of the transaction, the background system server may send the successful transaction receipt information to the intelligent cipher token via the terminal. The intelligent cipher token prompts the successful transaction receipt information after receiving it, and the successful transaction receipt information includes the electronic statement of account, based on which the user may check transaction details, such as specific transaction time, transaction number, transaction amount and goods purchased. Additionally, the background system server may send the successful transaction receipt information to the terminal to inform the terminal of the completion of the transaction. Certainly, the successful transaction receipt information may be sent to the terminal after undergoing the encryption calculation and/or the check calculation via the first session key; the terminal conducts the encryption calculation and/or the check calculation again via the second session key after the decryption calculation and/or the check verification calculation on the information, and sends the information to the intelligent cipher token; the intelligent cipher token prompts the user after the decryption calculation and/or the check verification calculation on the information. The successful transaction receipt information may be sent to the intelligent cipher token via the terminal after the background system server signs the information with the private key of the background system server; the intelligent cipher token prompts the user after the verification of the signed information by the intelligent cipher token passes. The successful transaction receipt information may also be sent to the terminal by the background system server after being signed and undergoing the encryption calculation and/or the check calculation via the first session key; the terminal conducts the encryption calculation and/or the check calculation again via the second session key after the decryption calculation and/or the check calculation on the information, and then sends the information to the intelligent cipher token; the intelligent cipher token prompts the user, after the decryption calculation and/or the check verification calculation and the verification passes.

Step 6: Refund

When the customer asks for a refund, a refunding operation may be realized in but not limited to the following ways.

First way: the terminal sends refund information to the intelligent cipher token. Specifically, the refund information may include account numbers of both parties involved in the refund, refund amount, refund transaction number, and identification information of the both parties, or any combination thereof. The refund information may further include an electronic statement of account, based on which the user may check refund details, such as specific refund time, the refund transaction number, the refund amount and goods refunded. Certainly, the refund information may be sent to the intelligent cipher token after the encryption calculation and/or the check calculation via the second session key, to guarantee the security and/or the completeness of information transmission. The terminal may further send the refund information in but not limited to the following ways. The terminal sends the refund information via the acoustic signal after encoding it; or the terminal graphically encodes the refund information and displays it for image collection by the intelligent cipher token; or the terminal sends the refund information via the communication interface of the terminal matching the intelligent cipher token.

The intelligent cipher token prompts the refund information after receiving it. Specifically, the intelligent cipher token informs the user of the refund information by voice broadcasting or displaying on the display screen, after receiving the refund information, such that the user confirms that the refund information is authentic. If the terminal conducts the encryption calculation and/or the check calculation on the refund information via the second session key, in this step, the second session key is also needed for the decryption calculation and/or the check verification calculation on the received information.

In order to save energy of the intelligent cipher token and prolong the service life thereof, the intelligent cipher token may further turn the sleep state into the awakened state after receiving the refund information, and prompt the refund information in the awakened state.

The intelligent cipher token receives a refund confirmation instruction, signs the refund information by using the private key of the intelligent cipher token, and generates refund confirmation information. Specifically, the user makes confirmation through a physical key or a virtual key of the intelligent cipher token, after the refund information is considered to be authentic. The intelligent cipher token turns the awakened state into the sleep state, after sending the refund confirmation information to the terminal (for example, after sending the acoustic signal corresponding to the refund confirmation information, or after displaying image information corresponding to the refund confirmation information for a predetermined time).

The terminal receives and verifies the refund confirmation information, and signs the refund confirmation information by using the private key of the terminal after the verification passes, so as to obtain a refund confirmation packet. Specifically, the terminal may receive the refund confirmation information in but not limited to the following ways. The terminal receives the acoustic signal sent by the intelligent cipher token and decodes the acoustic signal to obtain the refund confirmation information (e.g. the acoustic signal may be identified by the acoustic identification device and decoded by the acoustic decoder, so as to obtain the refund confirmation information); or the terminal collects image information (e.g. a 2-dimensional code, a barcode, etc.) displayed by the intelligent cipher token and decodes the image information to obtain the refund confirmation information (e.g. the image information is collected by the image collection device and decoded by the decoder to obtain the refund confirmation information); or the terminal receives the refund confirmation information via the communication interface of the terminal matching the intelligent cipher token. Additionally, the terminal verifies the refund confirmation information by using the public key of the intelligent cipher token.

The terminal sends a refund confirmation packet and the refund confirmation information to the background system server. Specifically, the terminal may directly send the refund confirmation packet and the refund confirmation information to the background system server, or may conduct encryption calculation and/or check calculation on the refund confirmation packet and the refund confirmation information via the first session key and then send them to the background system server, so as to guarantee the security and/the completeness of information transmission.

The background system server verifies the refund confirmation packet and the refund confirmation information separately after receiving them, and executes a refund operation after the verifications of the both pass. Specifically, if the terminal conducts the encryption calculation and/or the check calculation on the refund confirmation packet and the refund confirmation information via the first session key, in this step, the background system server will conduct decryption calculation and/or check verification calculation on the received information via the first session key. Additionally, the background system server verifies the refund confirmation packet by using the public key of the terminal, and verifies the refund confirmation information by using the public key of the intelligent cipher token.

Regarding the first way, provided an application scene of the refund, but the present disclosure is not limited thereby.

The terminal generates the refund information (which may be obtained by searching recorded transaction information, or may be re-generated, or may be in other forms) based on the refund intention of the customer, and the refund information is encrypted via the second session key between the terminal and the intelligent cipher token and sent to the intelligent cipher token.

The intelligent cipher token turns the sleep state into the awakened state after receiving the encrypted refund information, decrypts the encrypted refund information by using the second session key to obtain the refund information, and displays the refund information to the customer for confirmation.

The customer confirms the refund information to be right, and presses down the confirmation key on the intelligent cipher token to confirm; after receiving the refund confirmation instruction, the intelligent cipher token signs the refund information by using the private key of the intelligent cipher token to obtain the refund confirmation information, and encrypts the refund confirmation information by using the second session key and then sends it to the terminal.

After receiving the encrypted refund confirmation information, the terminal decrypts the information by using the second session key to obtain the refund confirmation information, and verifies validity of the refund confirmation information by using the public key of the intelligent cipher token; if the information is valid, the terminal signs the refund confirmation information by using the private key of the terminal to obtain the refund confirmation packet. Certainly, the terminal may directly sign the refund confirmation information to obtain the refund confirmation packet.

The terminal encrypts the refund confirmation packet and the refund confirmation information via the first session key and then sends them to the background system server.

The background system server decrypts the received information with the first session key after receiving the encrypted information, and verifies the refund confirmation packet by using the public key of the terminal and verifies the refund confirmation information by using the public key of the intelligent cipher token. If the verifications of the both pass, the refund operation is executed, and successful refund receipt information is sent to the terminal and/or the intelligent cipher token.

Second way: the difference from the first way lies in that the terminal further receives a refund request sent by the intelligent cipher token and generates the refund information based on the refund request, before sending the refund information to the intelligent cipher token. Specifically, the refund request may be generated in such a manner that the customer presses down a key on the intelligent cipher token; the intelligent cipher token sends the refund request to the terminal after receiving it. The refund information may further include the electronic statement of account, based on which the user may check refund details, such as specific refund time, the refund transaction number, the refund amount and goods refunded. Certainly, any implementation where the intelligent cipher token may be triggered to generate the refund request falls into the protection scope of the present disclosure.

In order to save energy of the intelligent cipher token and prolong the service life thereof, the intelligent cipher token may further turn the sleep state into the awakened state before sending the refund request to the terminal, send the refund request to the terminal in the awakened state, and then turn the awakened state into the sleep state after sending the refund request. The intelligent cipher token turns the sleep state into the awakened state when receiving the refund information sent by the terminal, and executes operations of prompting the refund information and generating the refund confirmation information in the awakened state. The intelligent cipher token turns the awakened state into the sleep state after sending the refund confirmation information to the terminal (e.g. after sending the acoustic signal corresponding to the refund confirmation information or after displaying the image information corresponding to the refund confirmation information for a predetermined time).

Third way: the intelligent cipher token sends the refund request to the terminal. Specifically, the refund request may be generated in such a manner that the customer presses down the key on the intelligent cipher token; the intelligent cipher token sends the refund request to the terminal after receiving it. Certainly, any implementation where the intelligent cipher token may be triggered to generate the refund request falls into the protection scope of the present disclosure.

In order to save energy of the intelligent cipher token and prolong the service life thereof, the intelligent cipher token may further turn the sleep state into the awakened state before sending the refund request to the terminal, and send the refund request to the terminal in the awakened state.

The terminal generates refund request identification, and sends the refund request identification to the intelligent cipher token. Specifically, the terminal may generate a random number and takes the random number as the refund request identification, in which the random number is offered to the intelligent cipher token to generate the refund information.

The intelligent cipher token generates the refund information after receiving the refund request identification, signs the refund information by using the private key of the intelligent cipher token to obtain the refund confirmation information, and sends the refund confirmation information to the terminal. Specifically, the intelligent cipher token generates the refund information by using the refund request identification, the refund amount and the refund account; the refund information may include any combination of the refund transaction number and the identification information of the both parties involved in the refund. The refund amount may be input via a key on the intelligent cipher token, and certainly may be input in other manners (like voice input). The refund account may be input via a key on the intelligent cipher token, and may be input by reading refund accounts pre-stored in the intelligent cipher token. Certainly, it is also possible to store the transaction information into the intelligent cipher token after the transaction is completed and then search the transaction information to obtain the refund amount and the refund account. Certainly, the refund information may be sent to the terminal after the encryption calculation and/or the check calculation via the second session key, so as to guarantee the security and the completeness of the information transmission. The intelligent cipher token may send the refund information in but not limited to the following ways. The intelligent cipher token sends the refund information via the acoustic signal after encoding it; or the intelligent cipher token graphically encodes the refund information and displays it for image collection by the terminal; or the intelligent cipher token sends the refund information via the communication interface of the intelligent cipher token matching the terminal.

In order to save energy of the intelligent cipher token and prolong the service life thereof, the intelligent cipher token may turn the awakened state into the sleep state after sending the refund confirmation information to the terminal (e.g. after sending the acoustic signal corresponding to the refund confirmation information or after displaying the image information corresponding to the refund confirmation information for a predetermined time).

The terminal receives and verifies the refund confirmation information, and after the verification passes, signs the refund confirmation information by using the private key of the terminal to generate the refund confirmation packet. Specifically, when the intelligent cipher token conducts the encryption calculation and/or the check calculation on the refund information via the second session key, in this step, the second session key is further used for the decryption calculation and/or the check verification calculation on the received information. The terminal may receive the refund confirmation information in but not limited to the following ways. The terminal receives the acoustic signal sent by the intelligent cipher token and decodes the acoustic signal to obtain the refund confirmation information (e.g. the acoustic signal may be identified by the acoustic identification device and decoded by the acoustic decoder, so as to obtain the refund confirmation information); or the terminal collects image information (e.g. a 2-dimensional code, a barcode, etc.) displayed by the intelligent cipher token and decodes the image information to obtain the refund confirmation information (e.g. the image information is collected by the image collection device and decoded by the decoder to obtain the refund confirmation information); or the terminal receives the refund confirmation information via the communication interface of the terminal matching the intelligent cipher token. Additionally, the terminal verifies the refund confirmation information by using the public key of the intelligent cipher token.

The terminal sends the refund confirmation packet and the refund confirmation information to the background system server. Specifically, the terminal may directly send the refund confirmation packet and the refund confirmation information to the background system server, or may conduct the encryption calculation and/or the check calculation on the refund confirmation packet and the refund confirmation information via the first session key and then send them to the background system server, so as to guarantee the security and/the completeness of information transmission.

The background system server verifies the refund confirmation packet and the refund confirmation information separately after receiving them, and executes the refund operation after the verifications of the both pass. Specifically, if the terminal conducts the encryption calculation and/or the check calculation on the refund confirmation packet and the refund confirmation information via the first session key, in this step, the background system server will conduct the decryption calculation and/or the check verification calculation on the received information via the first session key. Additionally, the background system server also verifies the refund confirmation packet by using the public key of the terminal, and verifies the refund confirmation information by using the public key of the intelligent cipher token.

Regarding the third way, provided an application scene of the refund, but the present disclosure is not limited thereby.

The intelligent cipher token turns the sleep state into the awakened state. For example, the intelligent cipher token enters the awakened state through the key-pressing operation from the customer in possession of the intelligent cipher token.

The customer may press down the key on the intelligent cipher token to generate the refund request, and the intelligent cipher token sends the refund request to the terminal after receiving it.

The terminal may generate a random number R, take the random number R as the refund request identification, and send the refund request identification to the intelligent cipher token.

The intelligent cipher token generates the refund information, signs the refund information by using the private key of the intelligent cipher token to obtain the refund confirmation information, and sends the refund confirmation information to the terminal, in which the refund information at least includes the refund request identification, the refund amount and the refund account. The refund amount and the refund account may be input by the customer via a key on the intelligent cipher token; or the refund amount may be input by the customer via a key on the intelligent cipher token, while the refund account may be obtained by reading information pre-stored in the intelligent cipher token; or the refund amount and the refund account both may be obtained by reading the information pre-stored in the intelligent cipher token. The intelligent cipher token encrypts the refund confirmation information via the second session key between the terminal and the intelligent cipher token, and sends the information to the terminal.

After receiving the encrypted refund confirmation information, the terminal decrypts it via the second session key to obtain the refund confirmation information, and verifies the validity of the refund confirmation information by using the public key of the intelligent cipher token. If the information is right, the terminal signs the refund confirmation information again by using the private key of the terminal to obtain the refund confirmation packet. Certainly, the terminal may directly sign the refund confirmation information to obtain the refund confirmation packet.

The terminal encrypts the refund confirmation packet and the refund confirmation information via the first session key and then sends them to the background system server.

The background system server decrypts the encrypted information via the first session key after receiving the information, and verifies the refund confirmation packet by using the public key of the terminal and verifies the refund confirmation information by using the public key of the intelligent cipher token. If the verifications of the both pass, the refund operation is executed, and the successful refund receipt information is sent to the terminal and/or the intelligent cipher token.

For the above three refunding ways, the refund confirmation packet or the refund confirmation information may further include single refund identification which may be a random number to ensure that a refund may be successfully executed only once. Certainly, the single refund identification may be generated by the terminal or by the intelligent cipher token, or may be signed by the terminal in the refund confirmation packet or signed by the intelligent cipher token in the refund confirmation information.

Certainly, the background system server may further send the successful refund receipt information to the terminal and/or the intelligent cipher token after executing the refund operation, such that the shop and/or the customer may be informed that the refund has succeeded.

Therefore, through the above refund flow path, operations of the customer in the refund process may be simplified considerably, and relevant security functions of the intelligent cipher token may guarantee the security of the refund process, which brings about seamless user experience.

Step 7: Cancellation

The term cancellation in embodiments of the present disclosure includes terminal cancellation and intelligent cipher token cancellation, and the terminal cancellation will be first exemplified.

The terminal obtains a terminal cancellation application, signs the terminal cancellation application by using the private key of the terminal to generate sixth signature information, and sends the terminal cancellation application and the sixth signature information to the background system server. Specifically, the terminal may directly send the terminal cancellation application and the sixth signature information to the background system server; or the terminal may conduct encryption calculation and/or check calculation on the terminal cancellation application and the sixth signature information via the first session key, and send the calculated information to the background system server to guarantee the security and the completeness of the information transmission.

The background system server verifies the sixth signature information by using the public key in the pre-stored terminal certificate, after receiving the terminal cancellation application and the sixth signature information. Specifically, if the terminal conducts the encryption calculation and/or the check calculation via the first session key, in this step, the background system server will use the first session key to conduct decryption calculation and check verification calculation on the received information.

The background system server deletes the pre-stored terminal certificate after verification of the sixth signature information passes, generates terminal cancellation completion information and sends the terminal cancellation completion information to the terminal. Specifically, during the terminal cancellation, the background system server may put the information corresponding to the terminal into a cancellation list preset in the background system server or perform other cancellation operations, apart from the deletion of the pre-stored terminal certificate. Additionally, the terminal cancellation completion information may be obtained through the encryption calculation and/or the check calculation via the first session key, and may be obtained by being signed with the private key of the background system server, or may be obtained through the encryption calculation and/or the check calculation via the first session key, after being signed with the private key of the background system server.

The terminal deletes the private key of the terminal after receiving the terminal cancellation completion information. Specifically, after receiving the terminal cancellation completion information, the terminal deletes the private key, and certainly may further refuse to execute any transaction operation associated with the background system server which sends the terminal cancellation completion information. Additionally, the terminal may conduct the decryption calculation and/or the check verification calculation and/or a verification via the first session key.

In the following, the intelligent cipher token cancellation will be exemplified.

The intelligent cipher token obtains an intelligent cipher token cancellation application, signs the intelligent cipher token cancellation application by using the private key of the intelligent cipher token to generate seventh signature information, and sends the intelligent cipher token cancellation application and the seventh signature information to the background system server. Specifically, the seventh signature information may be sent via the terminal or processed manually, and may undergo the encryption calculation and/or the check calculation via the first session key and the second session key, so as to guarantee the security of the information transmission.

The background system server verifies the seventh signature information by using the public key in the pre-stored intelligent cipher token certificate, after receiving the intelligent cipher token cancellation application and the seventh signature information. Specifically, if the terminal conducts the encryption calculation and/or the check calculation via the first session key, in this step, the background system server will use the first session key to conduct decryption calculation and check verification calculation on the received information.

The background system server deletes the pre-stored intelligent cipher token certificate after verification of the seventh signature information passes, generates intelligent cipher token cancellation completion information and sends the intelligent cipher token cancellation completion information to the intelligent cipher token. Specifically, during the intelligent cipher token cancellation, the background system server may put the information corresponding to the intelligent cipher token into a cancellation list preset in the background system server or perform other cancellation operations, apart from the deletion of the pre-stored intelligent cipher token certificate. Additionally, the intelligent cipher token cancellation completion information may be sent to the intelligent cipher token via the terminal, in which the intelligent cipher token cancellation completion information may be obtained through the encryption calculation and/or the check calculation via the first session key, and may be obtained by being signed with the private key of the background system server, or may be obtained through the encryption calculation and/or the check calculation via the first session key, after being signed with the private key of the background system server.

The intelligent cipher token deletes the private key of the intelligent cipher token after receiving the intelligent cipher token cancellation completion information. Specifically, the intelligent cipher token may verify the signature information, and execute the deletion operation after the verification passes; or may obtain the information through decryption and/or check verification via the second session key; and certainly may verify the signature information after obtaining the information through decryption and/or check verification via the second session key, all of which fall into the protection scope of the present disclosure as long as the security and/or the completeness of information transmission is ensured.

The background system server ensures the legitimacy of the terminal and the intelligent cipher token, and avoids financial loss due to illegal embezzlement of the terminal or the intelligent cipher token, by managing the registration, cancellation, authentication and locking of the terminal and the intelligent cipher token.

It shall be noted that steps 1 to 7 are not necessarily executed sequentially, and perhaps only several steps are completed; and steps 1 to 7 are not necessarily implemented in one application scenes, that is, implementations in any kinds of application scenes fall into the protection scope of the present disclosure, as long as any one of steps 1 to 7 is used to complete the transaction safely.

An example application scene of the present disclosure is presented below.

In this application scene, an intelligent cipher token is integrated with a wireless communication module and a state control module to form a novel intelligent cipher token for secure payment according to the present disclosure. The intelligent cipher token includes a wireless communication module which may be a Bluetooth communication module or a Wi-Fi communication module, and the wireless communication module may scan other devices by inquiring and paging and may exchange signals and data with other wireless devices. Meanwhile, the intelligent cipher token also includes a state control module configured to control working states of the wireless communication module and the host. The intelligent cipher token according to the present disclosure has two states, namely, a sleep state and an awakened state; in the sleep state, only a transceiver (i.e. the wireless communication module) and the state control module are working, while CPU is closed and cannot implement instruction operations (e.g. signing, and receiving and sending data), such that the intelligent cipher token is in a low-consumption state. When other wireless devices send an application instruction to this intelligent cipher token, the state control module may identify these signals, and generate a wake-up signal to awaken the CPU, such that the CPU starts executing the application instruction in the awakened state. After the instruction is executed, the CPU enters the sleep state again.

In the following, a complete transaction process of the present disclosure will be illustrated briefly.

An intelligent cipher token is in the sleep state; a user brings the intelligent cipher token into a wireless signal coverage range of a terminal; the intelligent cipher token and the terminal complete interactive recognition suitable for wireless devices; that is, the terminal is able to know that the intelligent cipher token enters the shop where the terminal is and to establish connection with the intelligent cipher token.

After the connection between the terminal and the intelligent cipher token is established, the terminal sends a device authentication request to the intelligent cipher token; the intelligent cipher token receives the request and the state control module sends the wake-up signal, such that the CPU is awakened and the intelligent cipher token enters the awakened state to execute corresponding operations.

The intelligent cipher token returns to the sleep state after completing corresponding operations, and remains interactive recognition with the terminal, such that the terminal may judge whether the owner of the intelligent cipher token leaves the shop.

After the mutual authentication between the terminal and the intelligent cipher token passes, the terminal puts forward a user information reading request to the background system server, and the background system server makes a user authorization information inputting request, in which case the terminal sends a user authorization request to the intelligent cipher token.

The intelligent cipher token in the sleep state enters the awakened state upon receiving the user authorization request from the terminal. The intelligent cipher token displays the request from the terminal and prompts the user to judge whether to authorize.

The user judges whether to authorize based on the displayed request sent by the terminal; if the request is allowed, the user presses down a confirmation key on the intelligent cipher token, such that the intelligent cipher token generates authorization information, send the authorization information to the terminal, and enters the sleep state; otherwise, the intelligent cipher token stops executing instructions and directly enters the sleep state.

For settlement of transaction, the terminal sends a user transaction confirmation request instruction to the intelligent cipher token which is in the sleep state; the intelligent cipher token in the sleep state enters the awakened state based on the received instruction, and displays the transaction information received to the user for confirmation; if the transaction information is right, the user presses down the confirmation key to make the intelligent cipher token sign the transaction information and send the information back to the terminal; otherwise, execution of operations is stopped, and the intelligent cipher token enters the sleep state.

In the following, another application scene of the present discourse is provided.

The background system server conducts the mutual authentication with the terminal, and establishes a secure channel to negotiate a shared session key K1.

The terminal established a current user list in a local server, and the current user list may be used to store the user information corresponding to intelligent cipher tokens owned by customers in the shop at present.

The local server of the terminal monitors the intelligent cipher tokens in the wireless signal coverage range of the terminal in a wireless manner (for example, via a wireless detection device).

The customer takes an intelligent cipher token having a wireless communication function (in the sleep state) with him when shopping; the intelligent cipher token may be scanned by the terminal and establish wireless connection with the terminal when the customer goes into the wireless signal coverage range of the terminal.

The terminal conducts the mutual authentication with the intelligent cipher token, and establishes a secure channel to negotiate a shared session key K2.

The terminal sends, to the background system server, a request for reading the user information corresponding to the intelligent cipher token.

The background system server generates a random number (single authorization identification) as a parameter for generating the user authorization information, and encrypts the random number by using the session key K1.

The background system server sends the user authorization request information to the terminal, and sends a first random number cryptograph to the terminal.

The terminal decrypts the cryptograph, and encrypts the random number by the session key K2 negotiated between the terminal and the intelligent cipher token.

The terminal sends the user authorization request information to the intelligent cipher token, and sends a second random number cryptograph to the intelligent cipher token.

The intelligent cipher token turns into the awakened state after receiving the user authorization request information, decrypts the second random number cryptograph by the session key K2, and displays the user authorization request information on the display screen of the intelligent cipher token, waiting the user to confirm the information.

The user makes judgment on the information; if the request information is not allowed, the user conducts a refuse, the intelligent cipher token turns into the sleep state.

If the request information is allowed, the user presses down the confirmation key on the intelligent cipher token; and the intelligent cipher token summarizes and signs the random number (the single authorization identification), takes the signature value as the user authorization information, encrypts the signature value with the session key K2, sends the signature value to the terminal, and then turns into the sleep state.

The terminal decrypts the signature value by using the session key K2, encrypts the signature value by using the session key K1, and then sends the signature value to the background system server.

The background system server decrypts the signature value by using the session key K1 to obtain a signature, decrypts the signature by using the public key of the intelligent cipher token, and compares a summary generated by using the random number generated by itself with a value obtained after decrypting the signature; if the summary and the value are not consistent, error information is sent back and operations are stopped.

If they are consistent, the background system server encrypts the user information by using the session key K1 to generate a user authorization information check value (first check value), and sends a cryptograph and the first check value to the terminal, in which the first check value may be in the form of MAC or in the form of a hash function plus a signature.

The terminal receives the user information and stores it into the current user list.

The customer settles the transaction at the cashier after shopping.

The terminal settles the transaction amount and chooses, from the current user list, an account corresponding to the intelligent cipher token owned by the customer.

The terminal generates the transaction information from the transaction amount, the accounts of the payer and the payee, the identification information of the payer and the payee, and encrypts the transaction information by using the session key K2.

The terminal sends the transaction request information to the intelligent cipher token, and sends a transaction information cryptograph to the intelligent cipher token.

The intelligent cipher token turns into the awakened state after receiving the transaction request information from the terminal, and decrypts the transaction information into plaintext to be displayed on the screen.

The customer confirms the transaction information; if any problem, a cancellation key is pressed down and the transaction is suspended. The intelligent cipher token turns into the sleep state.

If no problem, the confirmation key is pressed down, and the intelligent cipher token generates the random number as a single transaction identification.

The intelligent cipher token summarizes and signs the transaction information and the random number, encrypts a signature by using the session key K2, obtains user transaction confirmation information and sends the user transaction confirmation information to the terminal.

The terminal decrypts the user transaction confirmation information to generate the transaction data packet (including the transaction amount, the accounts of the payer and the payee, and unique identification information thereof), encrypts the transaction data packet by using the session key K1, and generates a transaction data packet check value (a second check value).

The terminal sends, to the background system server, a transfer application, as well as a transaction data packet cryptograph and the second check value.

The background system server deals with the transfer application, and sends payment completion information which represents successful transfer to the terminal. Certainly, the background system server may send the payment completion information to the intelligent cipher token via the terminal, such that the customer may know that the transaction is completed.

The terminal receives the payment completion information, the goods are delivered to the customer, and the transaction is completed.

Through the mutual authentication between the terminal and the background system server, the terminal may authenticate the legitimacy of the intelligent cipher token by using the reliable background system server, after the legitimacy of the background system server is confirmed. Meanwhile, the transaction security of the terminal may be ensured after the background system server and the intelligent cipher token are verified to be reliable. The transaction security of the intelligent cipher token may be ensured through the verification of the legitimacy of the terminal by using the background system server and manual confirmation of the information displayed on the intelligent cipher token during the transaction.

With the secure data interactive method according to the present disclosure, the customer does not need any account carrier devices, for example mobile phones, bank cards or financial IC cards, to finish the payment, when transacting in the shop. In the prior art, the payment process needs a device with the account storage function, for example, a SIM card or a smart card, and the user needs to swipe card or tap the mobile phone, so as to complete the transaction. However, with the method according to the present disclosure, the customer can finish the payment without need for the purse, the credit card and the mobile phone, thereby simplifying interactive operations between the customer and the merchant, improving the payment efficiency, and upgrading the user experience during near-field payment; meanwhile, the security features of the intelligent cipher token may ensure the security of the customer payment process.

When the customer chooses goods and pays for them, the terminal may obtain the user information without swiping cards or tapping mobile phones manually, because the user information has been stored in the current user list of the terminal when the customer just enters the shop. In such a case, the customer only needs to offer his name when paying for goods, and the terminal may directly send the transaction information (including the settlement amount) to the intelligent cipher token of the customer and display the transaction information thereon, such that the customer only needs to confirm the transaction information through the intelligent cipher token and outputs the transaction confirmation information; the terminal generates the transaction data packet and sends it to the background system server; the background system server conducts the transfer after verifying that the transaction data packet is right. In such a way, the payment process may be completed.

When the customer walks out of the signal coverage range of the shop, the network connection between the intelligent cipher token and the terminal will break off automatically, and the user information disappears from the current user list corresponding to the shop. If the customer walks into another shop, the user information will be recorded in the current user list corresponding to the other shop, and another shopping begins. In such a way, the customer does not need any operations, as long as the customer takes a small intelligent cipher token with him. The present disclosure can bring about the seamless user experience.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from that which is depicted or discussed, including executing functions in a substantially simultaneous manner or in an opposite order according to the related functions. This should be understood by those skilled in the art to which embodiments of the present disclosure belong.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A secure data interactive method, comprising:
scanning, by a terminal, an intelligent cipher token in a signal coverage range and obtaining identification information of the intelligent cipher token;
conducting a mutual authentication between the terminal and at least one of a background system server and the intelligent cipher token;
obtaining, by the terminal, user information corresponding to the intelligent cipher token based on the identification information of the intelligent cipher token; and
storing, by the terminal, the user information into a pre-established current user list;
wherein obtaining by the terminal user information corresponding to the intelligent cipher token based on the identification information of the intelligent cipher token comprises:
sending, by the terminal, the identification information of the intelligent cipher token and a user information reading request to the background system server;
obtaining, by the background system server, the user information corresponding to the intelligent cipher token based on the identification information of the intelligent cipher token, after the background system server receives the identification information of the intelligent cipher token and the user information reading request; obtaining, by the background system server, response information of the user information reading request based on the user information and sending the response information of the user information reading request to the terminal; and obtaining, by the terminal, the user information based on the response information of the user information reading request, after the terminal receives the response information of the user information reading request; or sending, by the terminal, a user information reading request to the intelligent cipher token, based on the identification information of the intelligent cipher token; obtaining, by the intelligent cipher token, pre-stored user information, obtaining response information of the user information reading request based on the pre-stored user information, and sending the response information of the user information reading request to the terminal; and obtaining, by the terminal, the user information based on the response information of the user information reading request, after the terminal receives the response information of the user information reading request.

2. The method according to claim 1, after scanning by a terminal an intelligent cipher token in a signal coverage range and obtaining identification information of the intelligent cipher token, further comprising:

generating, by the terminal, a real-time identification list, after the terminal obtains identification information of all intelligent cipher tokens in the signal coverage range of the terminal;

comparing, by the terminal, each piece of identification information in the real-time identification list with all the identification information in the pre-established current user list, at a predetermined time interval;

executing, by the terminal, the step of obtaining user information corresponding to an scanned intelligent cipher token respectively based on identification information included in the real-time identification list but not included in the pre-established current user list;

deleting, from the pre-established current user list, user information corresponding to each intelligent cipher token with the identification information included in the pre-established current user list but not included in the real-time identification list.

3. The method according to claim 1, after scanning by a terminal an intelligent cipher token in a signal coverage range and obtaining identification information of the intelligent cipher token, further comprising:

generating, by the terminal, a real-time identification list, after the terminal obtains identification information of all intelligent cipher tokens in the signal coverage range of the terminal;

comparing, by the terminal, each piece of identification information in the real-time identification list with all the identification information in the pre-established current user list, at a predetermined time interval;

executing, by the terminal, the step of obtaining user information corresponding to an scanned intelligent cipher token respectively based on identification information included in the real-time identification list but not included in the pre-established current user list, and storing obtained user information into the real-time identification list; copying user information corresponding to each intelligent cipher token with the identification information included in the real-time identification list and included in the pre-established current user list from the pre-established current user list to the real-time identification list; and taking the real-time identification list as an updated current user list.

4. The method according to claim 1, after sending by the terminal the identification information of the intelligent cipher token and a user information reading request to the background system server, further comprising:

judging, by the background system server, whether the identification information of the intelligent cipher token is included in an intelligent cipher token abnormality list pre-stored in the background system server;

after the background system server judges that the identification information of the intelligent cipher token is included in the intelligent cipher token abnormality list, obtaining, by the background system server, an intelligent cipher token locking instruction, signing the intelligent cipher token locking instruction by using a private key of the background system server to generate fifth signature information, and sending the intelligent cipher token locking instruction and the fifth signature information to the intelligent cipher token via the terminal;

verifying, by the intelligent cipher token, the fifth signature information by using a public key in a pre-stored background system server certificate, after the intelligent cipher token receives the intelligent cipher token locking instruction and the fifth signature information; and executing, by the intelligent cipher token, an intelligent cipher token locking operation based on the intelligent cipher token locking instruction, after the fifth signature information is successfully verified.

5. The method according to claim 1, further comprising:
receiving and checking, by the background system server, a terminal registration application;

sending, by the background system server, a terminal key pair generating instruction to the terminal, after the terminal registration application is successfully checked;

generating, by the terminal, a terminal key pair after the terminal receives the terminal key pair generating instruction;

sending, by the terminal, a public key in the terminal key pair to the background system server;

generating, by the background system server, a terminal certificate and sending the terminal certificate to the terminal, after the background system server receives the public key in the terminal key pair;

storing, by the terminal, the terminal certificate; and receiving and checking, by the background system server, an intelligent cipher token registration application;

sending, by the background system server, an intelligent cipher token key pair generating instruction to the intelligent cipher token, after the intelligent cipher token registration application is successfully checked;

generating, by the intelligent cipher token, an intelligent cipher token key pair after the intelligent cipher token receives the intelligent cipher token key pair generating instruction;

sending, by the intelligent cipher token, a public key in the intelligent cipher token key pair to the background system server;

generating, by the background system server, an intelligent cipher token certificate and sending the intelligent cipher token certificate to the intelligent cipher token, after the background system server receives the public key in the intelligent cipher token key pair; and storing, by the intelligent cipher token, the intelligent cipher token certificate.

6. The method according to claim 5, further comprising:

obtaining, by the terminal, a terminal cancellation application, signing the terminal cancellation application by using a private key of the terminal to generate sixth signature information, and sending the terminal cancellation application and the sixth signature information to the background system server; verifying, by the background system server, the sixth signature information by using a public key in the terminal certificate pre-stored, after the background system server receives the terminal cancellation application and the sixth signature information; after the sixth signature information is successfully verified, deleting, by the background system server, the terminal certificate pre-stored, generating terminal cancellation completion information and sending the terminal cancellation completion information to the terminal; deleting, by the terminal, the private key of the terminal after the terminal receives the terminal cancellation completion information;

and/or obtaining, by the intelligent cipher token, an intelligent cipher token cancellation application, signing the intelligent cipher token cancellation application by using a private key of the intelligent cipher token to generate seventh signature information, and sending the intelligent cipher token cancellation application and the seventh signature information to the background system server; verifying, by the background system server, the seventh signature information by using a public key in the intelligent cipher token certificate pre-stored, after the background system server receives the intelligent cipher token cancellation application and the seventh signature information; after the seventh signature information is successfully verified, deleting, by the background system server, the intelligent cipher token certificate pre-stored, generating intelligent cipher token cancellation completion information and sending the intelligent cipher token cancellation completion information to the intelligent cipher token; deleting, by the intelligent cipher token, the private key of the intelligent cipher token after the intelligent cipher token receives the intelligent cipher token cancellation completion information.

7. The method according to claim 1, after the background system server receives the identification information of the intelligent cipher token and the user information reading request, and before the background system server sends the response information of the user information reading request to the terminal, further comprising:

sending, by the background system server, user authorization request information to the intelligent cipher token via the terminal;

generating, by the intelligent cipher token, authorization information and sending the authorization information to the background system server via the terminal, after the intelligent cipher token received the user authorization request information;

executing, by the background system server, the step of sending the response information of the user information reading request to the terminal, after the background system server receives the authorization information.

8. The method according to claim 1, wherein information transmitted between the background system server and the terminal is transmitted after at least one of an encryption calculation and a check calculation via a first session key, wherein the first session key is pre-stored in the background system server and the terminal or generated through a negotiation of the background system server and the terminal; and/or information transmitted between the terminal and the intelligent cipher token is transmitted after at least one of an encryption calculation and a check calculation via a second session key, wherein the second session key is pre-stored in the terminal and the intelligent cipher token or generated through a negotiation of the terminal and the intelligent cipher token.

9. A secure data interactive system, comprising: a terminal, a background system server and an intelligent cipher token; wherein, the terminal is configured to: scan the intelligent cipher token in a signal coverage range, and obtain identification information of the intelligent cipher token; conduct a mutual authentication with at least one of the background system server and the intelligent cipher token; obtain user information corresponding to the intelligent cipher token based on the identification information of the intelligent cipher token; and store the user information into a pre-established current user list;

when the terminal obtains the user information corresponding to the intelligent cipher token based on the identification information of the intelligent cipher token by cooperating with the background system server, the terminal is further configured to: send the identification information of the intelligent cipher token and a user information reading request to the background system server; and receive response information of the user information reading request sent by the background system server and obtain the user information based on the response information of the user information reading request; and the background system server is configured to: receive the identification information of the intelligent cipher token and the user information reading request sent by the terminal, and obtain the user information corresponding to the intelligent cipher token based on the identification information of the intelligent cipher token; and obtain the response information of the user information reading request based on the user information, and send the response information of the user information reading request to the terminal;

when the terminal obtains the user information corresponding to the intelligent cipher token based on the identification information of the intelligent cipher token by cooperating with the intelligent cipher token, the terminal is further configured to: send a user information reading request to the intelligent cipher token based on the identification information of the intelligent cipher token; receive response information of the user information reading request sent by the intelligent cipher token, and obtain the user information based on the response information of the user information reading request; and the intelligent cipher token is configured to: obtain pre-stored user information, obtain the response information of the user information reading request based on the pre-stored user information, and send the response information of the user information reading request to the terminal.

10. The system according to claim 9, wherein,
after scanning the intelligent cipher token in the signal coverage range and obtaining the identification information of the intelligent cipher token, the terminal is further configured to: obtain identification information of all intelligent cipher tokens in the signal coverage range of the terminal and generate a real-time identification list; compare each piece of identification information in the real-time identification list with all the identification information in the pre-established current user list, at a predetermined time interval; obtain user information corresponding to an scanned intelligent cipher token respectively based on identification information included in the real-time identification list but not included in the pre-established current user list; delete, from the pre-established current user list, user information corresponding to each intelligent cipher token with the identification information included in the pre-established current user list but not included in the real-time identification list.

11. The system according to claim 9, wherein,
after scanning the intelligent cipher token in the signal coverage range and obtaining the identification information of the intelligent cipher token, the terminal is further configured to: obtain identification information of all intelligent cipher tokens in the signal coverage range of the terminal and generate a real-time identification list; compare each piece of identification information in the real-time identification list with all the identification information in the pre-established current user list, at a predetermined time interval; obtain user information corresponding to an scanned intelligent cipher token respectively based on identification information included in the real-time identification list but not included in the pre-established current user list, and store obtained user information into the real-time identification list; copy user information corresponding to each intelligent cipher token with the identification information included in the real-time identification list and included in the pre-established current user list from the pre-established current user list to the real-time identification list; and take the real-time identification list as an updated current user list.

12. The system according to claim 9, wherein,
after the terminal sends the identification information of the intelligent cipher token and the user information reading request to the background system server, the background system server is further configured to: judge whether the identification information of the intelligent cipher token is included in an intelligent cipher token abnormality list pre-stored in the background system server; obtain an intelligent cipher token locking instruction, sign the intelligent cipher token locking instruction by using a private key of the background system server to generate fifth signature information, and send the intelligent cipher token locking instruction and the fifth signature information to the intelligent cipher token via the terminal, after the background system server judges that the identification information of the intelligent cipher token is included in the intelligent cipher token abnormality list; and
the intelligent cipher token is further configured to: receive the intelligent cipher token locking instruction and the fifth signature information and verify the fifth signature information by using a public key in a pre-stored background system server certificate; execute an intelligent cipher token locking operation based on the intelligent cipher token locking instruction, after the fifth signature information is successfully verified.

13. The system according to claim 9, wherein,
the background system server is further configured to: receive and check a terminal registration application; send a terminal key pair generating instruction to the terminal, after the terminal registration application is successfully checked; receive a public key in a terminal key pair sent by the terminal, generate a terminal certificate and send the terminal certificate to the terminal; the terminal is further configured to: receive the terminal key pair generating instruction sent by the background system server and generate the terminal key pair; send the public key in the terminal key pair to the background system server; store the terminal certificate;
and
the background system server is further configured to: receive and check an intelligent cipher token registration application; send an intelligent cipher token key pair generating instruction to the intelligent cipher token, after the intelligent cipher token registration application is successfully checked; receive a public key in an intelligent cipher token key pair sent by the intelligent cipher token, generate an intelligent cipher token certificate and send the intelligent cipher token certificate to the intelligent cipher token; the intelligent cipher token is further configured to: receive the intelligent cipher token key pair generating instruction sent by the background system server and generate the intelligent cipher token key pair; send the public key in the intelligent cipher token key pair to the background system server; store the intelligent cipher token certificate.

14. The system according to claim 13, wherein,
the terminal is further configured to: obtain a terminal cancellation application, sign the terminal cancellation application by using a private key of the terminal to generate sixth signature information, and send the terminal cancellation application and the sixth signature information to the background system server; receive terminal cancellation completion information sent by the background system server and delete the private key of the terminal; the background system server is further configured to: receive the terminal cancellation application and the sixth signature information sent by the terminal and verify the sixth signature information by using a public key in the terminal certificate pre-stored; after the sixth signature information is successfully verified, delete the terminal certificate pre-stored, generate the terminal cancellation completion information and send the terminal cancellation completion information to the terminal;
and/or
the intelligent cipher token is further configured to: obtain an intelligent cipher token cancellation application, sign the intelligent cipher token cancellation application by using a private key of the intelligent cipher token to generate seventh signature information, and send the intelligent cipher token cancellation application and the seventh signature information to the background system server; receive intelligent cipher token cancellation completion information sent by the background system server, and delete the private key of the intelligent cipher token; the background system server is further configured to: receive the intelligent cipher token cancellation application and the seventh signature information sent by the intelligent cipher token and verify the seventh signature information by using a public key in the intelligent cipher token certificate pre-stored; after the seventh signature information is successfully verified, delete the intelligent cipher token certificate pre-stored, generate the intelligent cipher token cancellation completion information and send the intelligent cipher token cancellation completion information to the intelligent cipher token.

15. The system according to claim 9, wherein,
the background system server is further configured to: send user authorization request information to the intelligent cipher token via the terminal; receive authorization information sent by the intelligent cipher token via the terminal and send the response information of the user information reading request to the terminal; and
the intelligent cipher token is further configured to: receive the user authorization request information sent by the background system server via the terminal, generate the authorization information, and send the authorization information to the background system server via the terminal.

16. The system according to claim 9, wherein information transmitted between the background system server and the terminal is transmitted after at least one of an encryption calculation and a check calculation via a first session key, wherein the first session key is pre-stored in the background system server and the terminal or generated through a negotiation of the background system server and the terminal; and/or
information transmitted between the terminal and the intelligent cipher token is transmitted after at least one of an encryption calculation and a check calculation via a second session key, wherein the second session key is pre-stored in the terminal and the intelligent cipher token or generated through a negotiation of the terminal and the intelligent cipher token.

* * * * *